US008308578B2

(12) United States Patent  
Gilbert et al.

(10) Patent No.: US 8,308,578 B2  
(45) Date of Patent: Nov. 13, 2012

(54) ELECTROMAGNETIC SWING

(75) Inventors: David Gilbert, Cumming, GA (US);
Stephen R. Burns, Cumming, GA (US);
Peter D. Jackson, Alpharetta, GA (US);
Charles Simons, Atlanta, GA (US);
Chen Jing Ru, Foshan (CN)

(73) Assignee: Kids II, Inc., Atlanta, GA (US)

( * ) Notice: Subject to any disclaimer, the term of this patent is extended or adjusted under 35 U.S.C. 154(b) by 247 days.

(21) Appl. No.: 12/637,326

(22) Filed: Dec. 14, 2009

(65) Prior Publication Data

US 2010/0151951 A1    Jun. 17, 2010

Related U.S. Application Data

(60) Provisional application No. 61/121,996, filed on Dec. 12, 2008, provisional application No. 61/138,286, filed on Dec. 17, 2008.

(51) Int. Cl.
*A63G 9/16* (2006.01)
*A63G 9/00* (2006.01)

(52) U.S. Cl. ..................................... 472/119; 297/260.2

(58) Field of Classification Search .......... 472/119–125; 446/227; 297/260.1, 260.2, 273; 318/119–134
See application file for complete search history.

(56) References Cited

U.S. PATENT DOCUMENTS

| 3,261,032 A | 7/1966 | Reardon |
| 3,842,450 A | 10/1974 | Pad |
| 3,849,812 A | 11/1974 | Walsh |
| 3,883,136 A | 5/1975 | Kim |
| 4,038,588 A | 7/1977 | Woolfson et al. |
| 4,491,317 A | 1/1985 | Bansal |
| 4,590,631 A | 5/1986 | Varney |
| 4,616,824 A | 10/1986 | Quinlan, Jr. et al. |
| 4,722,521 A | 2/1988 | Hyde et al. |
| 4,730,176 A | 3/1988 | Matsuo et al. |
| 4,785,678 A | 11/1988 | McGugan et al. |
| 4,805,902 A | 2/1989 | Casagrande |
| 4,904,926 A | 2/1990 | Pasichinskyj |
| 4,911,498 A | 3/1990 | Becher et al. |
| 4,934,981 A | 6/1990 | Stulbach |
| 4,945,269 A | 7/1990 | Kamm |

(Continued)

FOREIGN PATENT DOCUMENTS

CN        2667977        1/2005

(Continued)

OTHER PUBLICATIONS

International Search Report dated Jun. 4, 2010.

(Continued)

*Primary Examiner* — Kien Nguyen
(74) *Attorney, Agent, or Firm* — Alston & Bird LLP

(57) ABSTRACT

Various embodiments of the present invention are directed to a powered children's swing. In various embodiments, the swing includes a seat, swing frame, one or more swing arms, a first magnetic component, second magnetic component, swing motion sensor, and swing control circuit. The magnetic components are configured to generate a magnetic force that drives the seat along a swing path. The swing control circuit is configured to control the magnetic components based at least on input from the swing motion sensor and generate control signals causing the seat to swing with a substantially constant amplitude as specified by a user.

31 Claims, 9 Drawing Sheets

U.S. PATENT DOCUMENTS

| | | | |
|---|---|---|---|
| 4,947,883 A | 8/1990 | Mayo | |
| 4,978,166 A | 12/1990 | James | |
| 5,007,671 A | 4/1991 | Oprea | |
| 5,048,135 A | 9/1991 | Chen | |
| 5,063,912 A | 11/1991 | Hughes | |
| 5,074,616 A | 12/1991 | Smith | |
| 5,083,773 A | 1/1992 | Saint | |
| 5,307,531 A | 5/1994 | Kao | |
| 5,335,163 A | 8/1994 | Seiersen | |
| 5,363,871 A | 11/1994 | Garrand et al. | |
| 5,378,196 A | 1/1995 | Pinch et al. | |
| 5,394,131 A | 2/1995 | Lungu | |
| 5,464,381 A | 11/1995 | Wilson | |
| 5,525,113 A | 6/1996 | Mitchell et al. | |
| 5,574,339 A | 11/1996 | Kattwinkel et al. | |
| 5,586,351 A | 12/1996 | Ive | |
| 5,608,366 A | 3/1997 | Sako | |
| 5,660,597 A | 8/1997 | Fox et al. | |
| 5,694,030 A | 12/1997 | Sato et al. | |
| 5,769,727 A | 6/1998 | Fair et al. | |
| 5,803,817 A | 9/1998 | Stern | |
| 5,833,545 A | 11/1998 | Pinch et al. | |
| 5,846,136 A | 12/1998 | Wu | |
| 5,916,828 A | 6/1999 | Messner | |
| 5,975,631 A | 11/1999 | Fair et al. | |
| 5,984,791 A | 11/1999 | Fair et al. | |
| 6,012,756 A | 1/2000 | Clark-Dickson | |
| 6,022,277 A | 2/2000 | Jankowski | |
| 6,027,163 A | 2/2000 | Longenecker | |
| 6,027,409 A | 2/2000 | Favorito et al. | |
| 6,059,667 A | 5/2000 | Pinch | |
| 6,129,416 A | 10/2000 | Krueger et al. | |
| 6,155,976 A | 12/2000 | Sackner et al. | |
| 6,170,910 B1 | 1/2001 | Bapst | |
| 6,193,224 B1 | 2/2001 | Dillner et al. | |
| 6,246,561 B1 | 6/2001 | Flynn | |
| 6,319,138 B1 | 11/2001 | Fair et al. | |
| 6,339,304 B1 | 1/2002 | Allison et al. | |
| 6,361,446 B2 | 3/2002 | Lawson et al. | |
| 6,362,718 B1 | 3/2002 | Patrick et al. | |
| 6,378,940 B1 | 4/2002 | Longoria et al. | |
| 6,383,085 B1 | 5/2002 | Tseng | |
| 6,431,646 B1 | 8/2002 | Longoria | |
| 6,511,123 B1 | 1/2003 | Sitarski et al. | |
| 6,561,915 B2 | 5/2003 | Kelly et al. | |
| 6,580,190 B2 | 6/2003 | Takasu | |
| 6,692,368 B1 | 2/2004 | Hyun | |
| 6,710,476 B2 | 3/2004 | Tanozaki et al. | |
| 6,739,659 B2 | 5/2004 | Dukes | |
| 6,764,133 B2 | 7/2004 | Osato | |
| 6,774,589 B2 * | 8/2004 | Sato et al. | 318/127 |
| 6,802,328 B2 | 10/2004 | Lin | |
| 6,814,670 B2 * | 11/2004 | Morita et al. | 472/119 |
| 6,824,473 B2 | 11/2004 | Wu | |
| 6,869,368 B1 | 3/2005 | Clarke et al. | |
| 6,875,117 B2 | 4/2005 | Rausil et al. | |
| 6,884,226 B2 | 4/2005 | Pereira | |
| 6,896,624 B2 | 5/2005 | Longenecker et al. | |
| 6,902,489 B2 | 6/2005 | Greger et al. | |
| 6,908,397 B2 | 6/2005 | Armbruster et al. | |
| 6,908,398 B1 | 6/2005 | Kang | |
| 6,916,249 B2 | 7/2005 | Meade | |
| 6,921,131 B2 | 7/2005 | Horvath et al. | |
| 6,939,194 B2 | 9/2005 | Bapst et al. | |
| 7,000,625 B2 | 2/2006 | Dickson et al. | |
| 7,011,363 B1 | 3/2006 | Commery | |
| 7,052,403 B2 | 5/2006 | Rausil et al. | |
| 7,081,052 B2 | 7/2006 | Greger et al. | |
| 7,118,173 B2 | 10/2006 | Kassai et al. | |
| 7,134,714 B1 | 11/2006 | Commery | |
| 7,211,974 B2 | 5/2007 | Takeuchi | |
| 7,219,959 B2 | 5/2007 | Rausil et al. | |
| 7,275,996 B2 | 10/2007 | Dillner et al. | |
| 7,354,352 B2 | 4/2008 | Keska et al. | |
| 7,493,666 B2 | 2/2009 | Michell | |
| 2002/0140263 A1 | 10/2002 | Sato et al. | |
| 2003/0056288 A1 | 3/2003 | Morita et al. | |
| 2004/0102253 A1 | 5/2004 | Rausil et al. | |
| 2005/0091744 A1 | 5/2005 | Mayyak | |
| 2005/0239565 A1 | 10/2005 | Rausil et al. | |
| 2005/0283908 A1 | 12/2005 | Wong et al. | |
| 2006/0019760 A1 | 1/2006 | Keska et al. | |
| 2006/0030415 A1 | 2/2006 | Waldman et al. | |
| 2006/0111194 A1 | 5/2006 | Dillner et al. | |
| 2006/0128486 A1 | 6/2006 | Tuckey | |
| 2007/0010338 A1 | 1/2007 | Wu et al. | |
| 2007/0049390 A1 | 3/2007 | Wu et al. | |
| 2007/0207870 A1 | 9/2007 | Armbruster et al. | |
| 2008/0098521 A1 | 5/2008 | Westerkamp et al. | |
| 2008/0194349 A1 | 8/2008 | Kwon | |
| 2009/0195878 A1 | 8/2009 | Kurosawa | |

FOREIGN PATENT DOCUMENTS

| | | |
|---|---|---|
| CN | ZL2004200006361.9 | 5/2005 |
| CN | 2778639 | 5/2006 |
| CN | 200730057030.7 | 6/2007 |
| CN | 200710029330.3 | 7/2007 |
| CN | ZL 200820235246.7 | 12/2009 |
| GB | 631026 | 10/1949 |
| JP | 56058259 | 5/1981 |
| JP | 11 089681 A | 4/1999 |
| JP | 2007-054104 | 8/2007 |
| JP | 2007 228640 A | 9/2007 |
| WO | WO 2008/131449 | 10/2008 |

OTHER PUBLICATIONS

International Search Report and Written Opinion for PCT/US2009/067906; Date of mailing: Oct. 7, 2010.

* cited by examiner

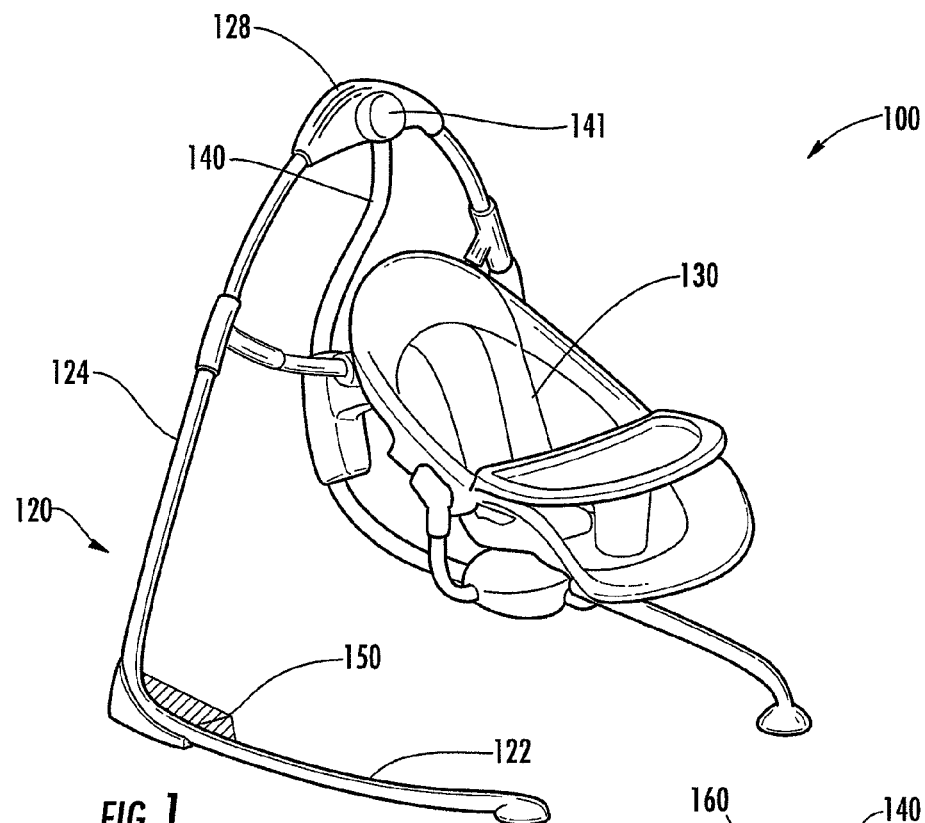
FIG. 1
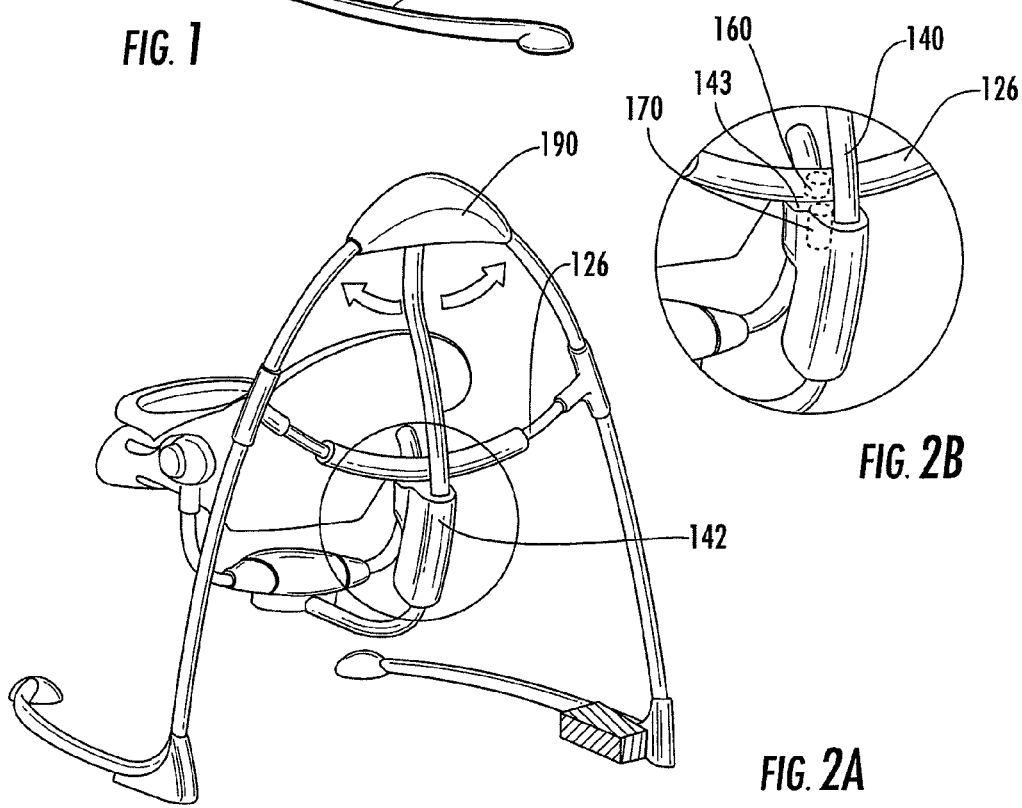
FIG. 2A
FIG. 2B

ELECTROMAGNETIC SWING

CROSS-REFERENCE TO RELATED APPLICATIONS

This application claims priority from provisional U.S. Application No. 61/121,996 entitled "Solenoid Swing," which was filed on Dec. 12, 2008 and is herein incorporated by reference. This application also claims priority from provisional U.S. Application No. 61/138,286 entitled "Magnet Motor Controller," which was filed on Dec. 17, 2008 and is herein incorporated by reference.

BACKGROUND OF THE INVENTION

Children's swings are typically used to entertain and put to sleep children, including infants, by providing a seat that swings smoothly along an arcuate path. Powered children's swings are particularly advantageous as they are configured to automatically swing a seat without the need for a parent or child to continuously provide a motive force to keep the seat in motion. Such powered children's swings are known to be powered in various configurations by motors (e.g., a direct current motor) via a mechanical linkage to the swing seat. Other powered children's swings make use of magnetic drive systems, which are advantageous over motor-driven swings for their superior reliability and quiet operation. For example, certain magnetically driven children's swings make use of an electromagnet configured to repel a single permanent magnet connected to a swing seat, thereby driving the seat along its arcuate path.

However, current magnetically driven children's swings have a number of drawbacks. Current swings are only configured to drive a swing seat with repulsive magnetic forces. As a result, current magnetic drive systems are only effective when the swing seat is moving away from one of the magnetic components. This limits the ability of such swings to control the dynamics of the swing's motion and provide a smooth and continuous driving force. In addition, as the magnetic force between two magnetic objects decreases over distance, significant gaps between the magnetic drive components of current swings reduces the power efficiency of their magnetic drive systems.

Accordingly, there is a need in the art for a magnetically driven children's swing with an improved magnetic drive system providing improved swing dynamics and greater power efficiency.

BRIEF SUMMARY OF THE INVENTION

Various embodiments of the present invention are directed to a powered children's swing that includes a magnetic drive system controlled by a swing control circuit and configured to drive the swing's seat such that the seat swings with an amplitude specified by a user. According to various embodiments, the magnetic drive system is comprised of at least two magnetic components configured to selectively generate a magnetic force which drives the swing seat. In one embodiment, the magnetic drive system is an electromagnetic drive system that includes an electromagnet operatively connected to the swing seat and configured to generate both attractive and repulsive magnetic forces with another magnetic component, thereby driving the swing seat. In another embodiment, the magnetic drive system is a solenoid drive system comprising a electromagnetic coil and a magnetic component configured to fit within the coil and generate a magnetic force that drives the swing seat. In each embodiment of the magnetic drive system, the swing control circuit is configured to monitor the amplitude of the seat and generate control signals causing the magnetic drive system to drive the swing seat at a user-defined amplitude.

According to various embodiments, the powered children's swing comprises a seat, swing frame, one or more swing arms, a first magnetic component, a second magnetic component, a swing motion sensor, and a swing control circuit. The one or more swing arms are rotatably supported on the swing frame, suspend the seat, and permit the seat to swing along a path. The first magnetic component is operatively connected to the swing frame and the second magnetic component is operatively connected to the seat. At least one of the magnetic components comprises an electromagnet. The swing motion sensor is configured to generate a signal indicative of an amplitude of the seat's swing motion. The swing control circuit is configured to receive the signal from the swing motion sensor, compare the signal with a goal amplitude for the swing, and generate an electrical signal based on the comparison that causes electric current to be supplied to the electromagnet thereby generating an attractive magnetic force between the first magnetic component and second magnetic component that causes the seat to swing with an amplitude nearer to the goal amplitude.

According to various other embodiments, the powered children's swing comprises a seat, swing frame, one or more swing arms, a first magnetic component, and second magnetic component. The swing frame supports the seat and defines at least one arcuate support member. The one or more swing arms are rotatably supported on the swing frame and support the seat thereby suspending the seat and permitting the seat to swing along a path. The arcuate support member is positioned adjacent the swing path of the seat and is curved generally parallel to the swing path of the seat. The first magnetic component is supported by the arcuate support member. The second magnetic component is operatively connected to the seat and is configured to move along a path generally parallel to and adjacent to the arcuate support member as the seat swings along its swing path. At least one of the magnetic components comprises an electromagnet configured to selectively generate a magnetic force with the other magnetic component so as to cause the seat to swing along its swing path.

According to various other embodiments, a powered children's swing comprises a seat, swing frame, one or more swing arms, first magnetic component, and second magnetic component. The swing frame is configured to support the seat and defines at least one support member. The one or more swing arms are rotatably supported on the swing frame and at least one of the swing arms supports the seat thereby suspending the seat and permitting the seat to swing along a path. The first magnetic component is supported by the support member. The second magnetic component is operatively connected to the seat and comprises an electromagnetic coil having a central cavity. The first magnetic component is positioned within the central cavity as the second magnetic component passes by the first magnetic component. The second magnetic component is configured to selectively generate a magnetic force with the first magnetic component so as to cause the seat to swing along its swing path.

BRIEF DESCRIPTION OF THE DRAWINGS

Reference will now be made to the accompanying drawings, which are not necessarily drawn to scale, and wherein:

FIG. 1 shows a front perspective view of a powered children's swing according to one embodiment of the present invention;

FIG. 2A shows a rear perspective view of a powered children's swing according to one embodiment of the present invention;

FIG. 2B shows an expanded rear perspective view of the area of a powered children's swing shown in FIG. 2A;

DETAILED DESCRIPTION OF THE INVENTION

Figure 3:
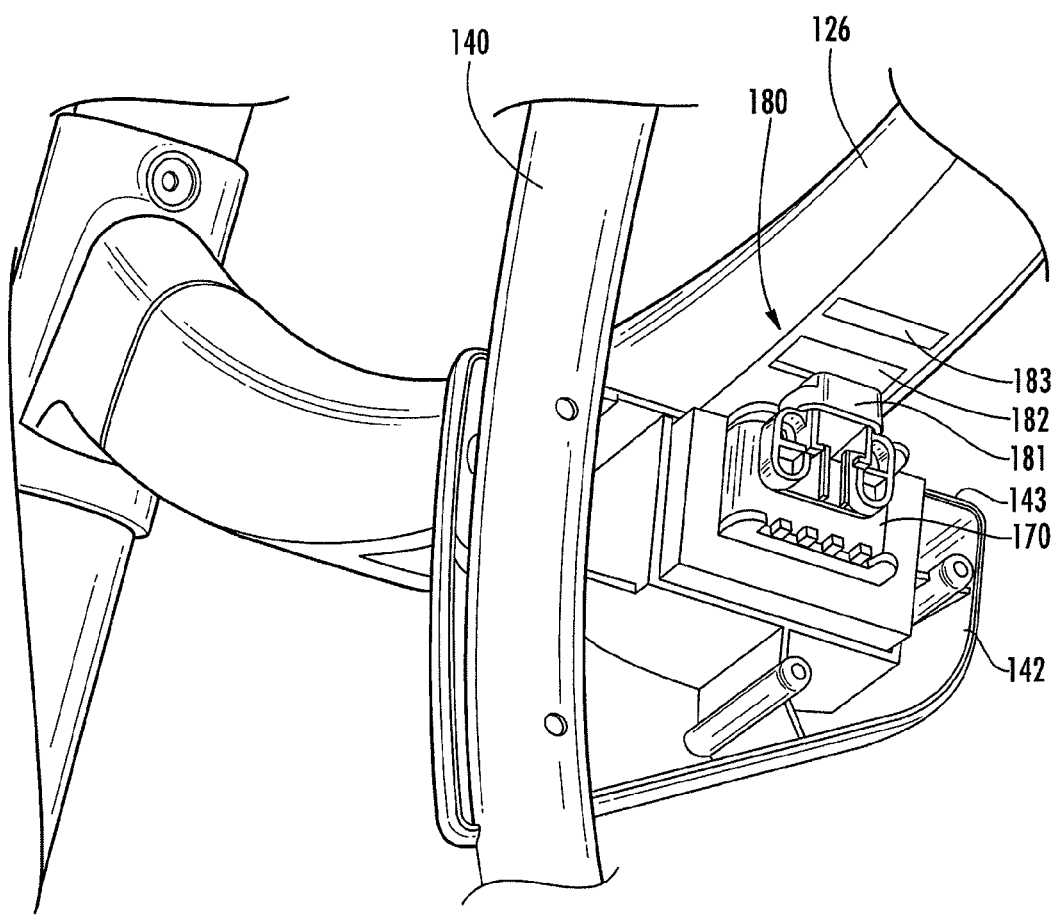
FIG. 3 shows a perspective view of the interior of a component of an electromagnetic drive system according to one embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As described above, various embodiments of the present invention are directed to a powered children's swing providing a seat that is driven along a swing path with controlled amplitude by a magnetic drive system. According to various embodiments, the powered children's swing generally includes a swing frame, seat, swing arm, magnetic drive system, power supply, swing motion sensor, and swing control circuit. As described above, in one embodiment, the magnetic drive system is an electromagnetic drive system. In another embodiment, the magnetic drive system is a solenoid drive system. Various embodiments of these drive systems and their respective control circuits are described herein.

Swing with Electromagnetic Drive System

As shown in FIG. 1, a powered children's swing 100 according to one embodiment includes a swing frame 120, seat 130, swing arm 140, power supply 150, electromagnetic drive system, swing motion sensor 180 (shown in FIG. 3), and a swing control circuit 190 (shown in FIG. 2A). The swing frame 120 includes a base portion 122 and a vertical portion 124. The base portion 122 is configured to rest on a support surface (e.g., a floor) and provide a stable base on which to support the other components of the swing 100. The vertical portion 124 extends upwardly from the base portion 122 forming an elevated arc from which the seat 130 is suspended. The vertical portion 124 also includes a support member 126 (shown in FIG. 2A) that extends arcuately from one side of the vertical portion 124 to an opposite side of the vertical portion 124. In addition, the arcuate shape of the support member 126 is substantially parallel to the swing path of the seat 130. The vertical portion 124 further includes user input controls 128 (e.g., buttons, dials, switches) positioned near the top of the arc formed by the vertical portion 124. As will be described in more detail below in relation to the swing control circuit 190, the user input controls 128 allow the user to control various aspects of the seat's 130 motion (e.g., amplitude), as well as additional features of the swing 100 (e.g., timer, sound and music controls).

The seat 130 is configured to support a child or infant and is rotatably connected to the vertical portion 124 of the swing frame 120 by a swing arm 140. The swing arm 140 is constructed of a suitably resilient material capable of supporting the weight of the seat 130 and a child occupying the seat 130. The upper end of the swing arm 140 is connected to the vertical portion 124 at a pivot point 141. From the pivot point 141, the swing arm 140 extends downwardly and curves below the seat 130 to one or more connection points. In the illustrated embodiment, the swing arm 140 is connected to a seat frame that directly supports the seat 130. In one embodiment, the seat 130 can be removed from the swing arm 140 by the user as desired. The pivot point 141 permits the swing arm 140 and seat 130 to swing laterally about the pivot point 141 and along an arcuate swing path (indicated by motion arrows in FIG. 2A). To prevent the vertical portion 124 of the swing frame 120 from interfering with the swing path of the seat 130, the bottom portion of the swing arm 140 extends forwardly to suspend the seat 130 slightly forward of the vertical portion 124 and pivot point 141.

The swing 100 further includes an electromagnetic drive system comprising a first magnetic component and second magnetic component configured to generate a magnetic force that drives the seat 130 along its swing path. In one embodiment, the first magnetic component is positioned within the support member 126. The second magnetic component is positioned within a housing 142 (shown in FIGS. 2A and 2B) connected to the swing arm 140, and is configured to be in close proximity to the first magnetic component along at least a portion of the seat's 130 swing path.

In the illustrated embodiment of FIG. 2B, the first magnetic component comprises a permanent magnet 160 positioned within a medial portion of the support member 126, equidistant from the ends of the support member 126 and between the seat 130 (shown in FIG. 1) and swing arm 140 (shown in FIG. 1). The permanent magnet 160 is vertically oriented within the support member 126 such that one of its poles faces upwards toward the pivot point 141, while the other pole faces downward toward the support surface. According to one embodiment, the permanent magnet 160 is comprised of a ferrous magnet stacked vertically with a neodymium magnet. In such an embodiment, one of the magnets is secured by an internal housing within the support member 126 and securely attracts the other magnet, thereby preventing either magnet from moving within the support member 126 in response to magnetic forces. According to various other embodiments, the permanent magnet 160 may be comprised of one or more other suitable magnets and may be secured within the support member 126 in any suitable fashion.

As shown in FIG. 2B, the second magnetic component comprises an electromagnetic coil 170 positioned within a housing 142. The housing 142 is connected to the swing arm 140 such that its upper end 143 is positioned beneath and adjacent the support member 126. As the swing arm 140 rotates about the pivot point 141, the upper end 143 of the housing 142 remains adjacent the support member 126. The electromagnetic coil 170 is vertically oriented within the housing 142 such that its uppermost pole is positioned near the upper end 143 of the housing 142. As a result, the uppermost pole of the electromagnetic coil 170 remains proximate to the support member 126 as the swing arm 140 rotates about the pivot point 141. In addition, the uppermost pole of the electromagnetic coil 170 is proximate to the lowermost pole of the permanent magnet 160 as the electromagnetic coil 170 swings by the permanent magnet 160. According to one embodiment, the electromagnetic coil 170 includes a metal core (e.g., steel, iron), which strengthens the magnetic force generated by the electromagnetic coil 170. In other embodiments, however, the electromagnet coil 170 does not include a metal core.

The electromagnetic coil 170 is configured to generate a magnetic force with the permanent magnet 160 when supplied with electric current from the power supply 150 (shown in FIG. 1). In the illustrated embodiment, the power supply 150 is comprised of one or more batteries (e.g., D cell, lithium ion, nickel cadmium) positioned within in a battery housing connected to the base portion 122 of the swing frame 120. According to various embodiments, the power supply 150 may be any suitable source of electric current (e.g., a plug-in AC/DC power supply).

As the direction of the electric current supplied to the electromagnetic coil 170 dictates its polarity, pulses of electric current transmitted to the electromagnetic coil 170 may generate a magnetic force repelling the electromagnetic coil 170 from the permanent magnet 160 (herein "push pulses") or a magnetic force attracting the electromagnetic coil 170 to the permanent magnet 160 (herein "pull pulses"). As the permanent magnet 160 is held in a fixed position within the support member 126 and the electromagnetic coil 170 is operatively connected to the seat 130, the magnetic forces generated by the magnetic components will drive the seat 130 along its swing path. By repeatedly transmitting electric current to the electromagnetic coil 170 as it passes by the permanent magnet 160, the seat 130 can be continuously driven along its swing path.

As the seat 130 is suspended slightly forward of the pivot point 141, the combined weight of the seat 130 and any load placed on the seat 130 (e.g., the weight of a child) creates a torque on the swing arm 140 about the pivot point 141 (i.e., a torque oblique to the pivot axis). As a result, the swing arm 140 flexes slightly downward and toward the vertical portion 124 of the swing frame 120. To optimize the power efficiency of the electromagnetic drive system, the swing arm 140 is configured to flex toward a target position in response to a target load. In some embodiments, the permanent magnet 160 and electromagnetic coil 170 are axially aligned when in the target position, allowing the lowermost pole of the permanent magnet 160 and uppermost pole of the electromagnetic coil 170 to be in close proximity one another. For example, in embodiments of the swing 100 specifically designed to accommodate infant children, the target load may be equal to the weight of an infant child (e.g., 10 pounds). Accordingly, when an infant weighing 10 pounds is placed in the seat 130, the swing arm 140 will flex into the target position. Likewise, in embodiments designed to accommodate a wider range of children, the target load may be the weight of an average child (e.g., 20 pounds). Although the electromagnetic drive system is configured to drive the seat 130 under any loading condition within the swing's design tolerances (e.g., when no child is positioned in the seat, or when a heavy child is positioned in the seat), the electromagnetic drive system operates more efficiently when the swing arm 140 is flexed to the target position.

In addition, the swing 100 is able to reduce the power needed to drive the seat 130 by applying the magnetic force generated by the electromagnetic coil 170 to the lower end of the swing arm 140. As the electromagnetic coil 170 is positioned at the bottom of the swing arm 140, a significant distance from the pivot point 141, the swing arm 140 has a high degree of leverage on the pivot point 141. This allows the electromagnetic drive system to generate the torque necessary to drive the seat 130 with less power than a drive system having less mechanical leverage.

As will be described in more detail below, the amplitude of the seat's 130 swinging motion is controlled by the swing control circuit 190, which is configured to control the timing, direction, and width of electric current supplied to the electromagnet coil 170 based on input (e.g., a signal) from the swing motion sensor 180 (shown in FIG. 3). According to various embodiments, the swing motion sensor 180 is configured to sense a characteristic of the seat's 130 motion and generate a signal indicative of the seat's 130 amplitude. For example, in the illustrated embodiment, the swing motion sensor 180 is configured to sense the velocity of the seat 130 at a target sensing point along its swing path and generate a signal indicating the sensed velocity (e.g., a signal having a time width corresponding to the velocity of the seat 130 as it passes the sensing point). As the amplitude of the seat's 130 motion correlates to the seat's 130 velocity, the signal generated by the swing motion sensor 180 is indicative of the seat's amplitude. As will be appreciated by one of skill in the art, the amplitude indicative signal generated by the swing motion sensor 180 may be representative of speed or velocity. In other embodiments, the swing motion sensor 180 is configured to sense when the seat 130 changes direction (e.g., at the peak of the seat's 130 swing path). For example, signals corresponding to the time elapsed between changes in the seat's 130 direction, or signals corresponding to the arc-length traveled between changes in the seat's 130 direction, would be also be indicative of the seat's 130 amplitude.

As shown in the illustrated embodiment of FIG. 3, the swing motion sensor 180 is comprised of an infrared sensor 181, a first reflective surface 182, and a second reflective surface 183. The infrared sensor 181 and first reflective surface 182 are configured to generate a velocity indicative signal, while the infrared sensor 181 and second reflective surface 183 are configured to generate a direction indicative signal. The infrared sensor 181 is positioned adjacent the electromagnetic coil 170 on the upper end 143 of the housing 142. As such, the infrared sensor 181 is continuously adjacent the support member 126 as the seat 130 (not shown) moves along its swing path. The first reflective surface 182 is positioned adjacent the permanent magnet 160 on the lower-side of the support member 126 such that, when the swing arm 140 is positioned equidistant from the ends of the support member 126, the first reflective surface 182 is directly above and adjacent the infrared sensor 181. As will be described in more detail below in relation to the swing control circuit 190, the velocity of the seat 130 as it passes by the center of the support member 126 (i.e., the velocity sensing point) may be determined by measuring the width of the signal generated by the infrared sensor 181 as it senses the reflection of the first reflective surface 182.

Although not necessary for the control of certain embodiments, the second reflective surface 183 permits the swing control circuit 190 to determine the direction in which the seat 130 is traveling. The second reflective surface 183 is positioned proximate to the first reflective surface 182 on the lower-side of the support member 126 such that the velocity of the seat 130 is substantially the same as the infrared sensor 181 passes by the first reflective surface 182 and the second reflective surface 183. In addition, the second reflective surface 183 has a width differing from the width of the first reflective surface 182. Accordingly, the swing control circuit 190 is able to differentiate between signals corresponding to the first reflective surface 182 and signals corresponding to the second reflective surface 183. By determining which signal is received first for a pair of signals corresponding to the reflective surfaces 182, 183, the swing control circuit 190 determines the direction the seat 130 is traveling as it passes by the center of the support member 126.

According to another embodiment (not shown), the swing motion sensor is comprised of an optical sensor (e.g., a computer mouse sensor) configured to sense the movement of a target, such as a wheel or wheel section, operatively connected to swing arm 140 (e.g., at the pivot point 181). In such an embodiment, the swing motion sensor 180 is able to sense the movement of the seat 130 by detecting the movement of the wheel. The wheel may also include one or more cut-out sections to provide a reference point for the swing control circuit 190. For example, in one embodiment, the reference point indicates the position of the swing arm 140. This embodiment of swing motion sensor 180 is advantageous in that it is capable of providing the absolute position and velocity of the seat 130 at any point along the seat's 130 swing path.

In addition, according to various other embodiments, the swing motion sensor 180 may be a Hall effect sensor, laser sensor, accelerometer, light interrupter, or other sensor suitable of generating a signal indicative of an amplitude of the seat's 130 motion and, if necessary, indicating the direction of the seat's 130 motion. According to yet another embodiment, the swing motion sensor may be comprised of multiple sensors configured to indicate the position, velocity, and/or direction of the seat 130 at one or more points along the seat's 130 swing path.

Swing Amplitude Control with Electromagnetic Drive System

Figure 10:
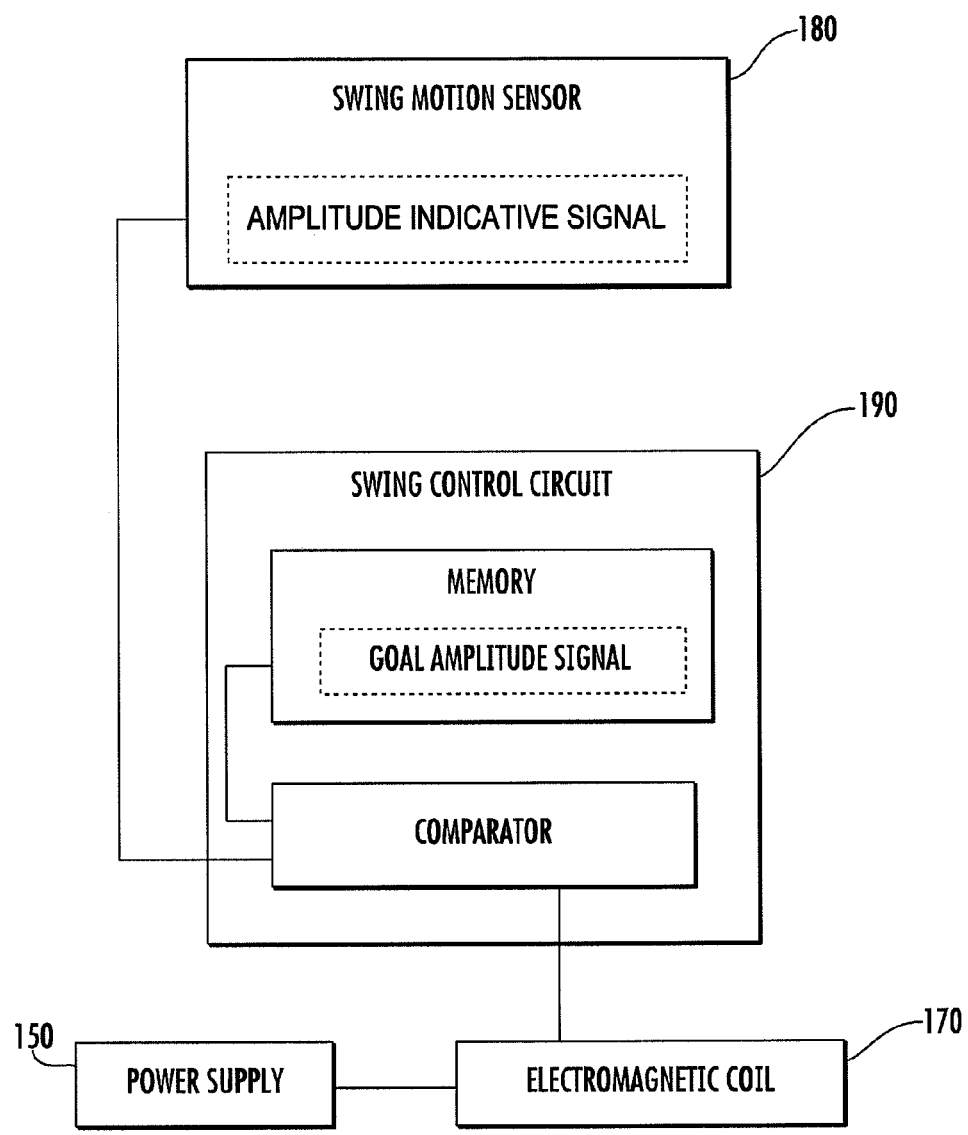
FIG. 10 shows a schematic view of the swing control circuit, swing motion sensor, power supply, and electromagnetic coil of a powered children's swing according to one embodiment.

According to various embodiments, the swing control circuit 190 comprises an integrated circuit configured to receive signals from the user input controls 128 and swing motion sensor 180, and generate control signals to control the amplitude of the seat's 130 motion. FIG. 10 shows a schematic diagram of one embodiment of the swing control circuit 190, including its internal memory and comparator and the connections between swing control circuit 190 and the swing motion sensor 180, electromagnetic coil 170, and power supply 150. In the illustrated embodiment of FIG. 1, the swing control circuit 190 is positioned proximate to the user input controls 128 within a housing situated at the top of the arc formed by the vertical portion 124 of the swing frame 120. As described briefly above, the control signals generated by the swing control circuit 190 are configured to control the timing, direction, and width of electric current transmitted from the power supply 150 to the electromagnet coil 170. Based on input from the swing motion sensor 180 and the user input controls 128, the swing control circuit 190 is configured to generate control signals causing the swing 130 to swing with an amplitude desired by the user.

In controlling the swing 100, the swing control circuit 190 first receives one or more control signals from one or more of the user input controls 128 indicating a target amplitude for the seat's 130 motion. In the illustrated embodiment, a user may select from six pre-defined amplitude settings via the user input controls 128. For example, in one embodiment, the first setting indicates the user would like the seat's 130 amplitude to remain between 9 and 10 degrees, where zero degrees is perpendicular to the support surface. The remaining five settings correspond to incrementally higher amplitude ranges (e.g., 14-15°, 17-18°, 22-23°, 26-27.5°, and 29.5-30.5°). When the user selects one of the pre-defined amplitude settings via the user controls 128, the swing control circuit 190 sets the corresponding amplitude range as the target amplitude. In addition, the user input controls 128 provide a manual amplitude setting, which allows the user to physically move the seat 130 to a desired amplitude and release the seat 130. When the swing control circuit 190 detects that the user has selected the manual amplitude setting, the swing control circuit 190 determines the amplitude of the seat 130 at the point it is released by the user and sets the determined amplitude as the target amplitude. The user input controls 128 also provide the user with the option of selecting a swing time defining how long the seat 130 will be driven at the target amplitude (e.g., 10 minutes).

Based on the control signals received from the user input controls 128, the swing control circuit 190 determines a target amplitude and, if specified, a swing time. Next, the swing control circuit 190 determines a target velocity corresponding to the target amplitude. The target velocity represents the velocity with which the seat 130 will pass by the swing motion sensor's 180 velocity sensing point when the seat 130 is swinging with an amplitude equal to the target amplitude. In one embodiment, the swing control circuit 190 retrieves the target velocity from a look-up table indicating target velocities for various ranges of amplitudes. In another embodiment, the swing control circuit 190 calculates the target velocity based on the target amplitude. In yet another embodiment, the control signal generated by the user input controls 128 is configured to directly indicate a programmed target velocity corresponding to the amplitude selected by the user.

After determining the target velocity, the swing control circuit 190 waits to receive a first signal from the swing motion sensor 180. In the illustrated embodiment, the user moves the seat 130 away from its resting point and release the seat 130 such that the seat 130 swings past the velocity sensing point of the swing motion sensor 180 (i.e., the center of the support member 126). The initial direction the seat 130 travels after being released by the user will be referred to herein as the "first direction." As the electromagnetic coil 170 swings past the velocity sensing point in the first direction, the swing control circuit receives 190 two initial signals from the swing motion sensor 180. As described above, one of the initial signals corresponds to the first reflective surface 182 (herein the "velocity signal"), while the other corresponds to the second reflective surface 183 (herein the "direction signal").

Based on the initial velocity signal, the swing control circuit 190 next determines the initial velocity of the seat 130. As described above in relation to the illustrated embodiment of FIG. 3, the velocity signal indicates that the infrared sensor 181 senses the presence of the first reflective surface 182. The resulting velocity signal has a leading edge, indicating the infrared sensor 181 is positioned beneath the first reflective surface 182, and a trailing edge, indicating the infrared sensor 181 is no longer beneath the first reflective surface 182. By measuring the time elapsed between the leading edge and trailing edge of the velocity signal, the swing control circuit 190 determines the width of the signal (e.g., in milliseconds). As the infrared sensor 181 moves past the first reflective surface 182 with the same velocity as the seat 130, the width of the velocity signal is inversely proportional to the velocity of the seat 130. Accordingly, the swing control circuit 190 determines the velocity of the seat 130 (e.g., in units of meters per second) as it passes by the velocity sensing point by dividing the width of the first reflective surface 182 (e.g., in millimeters) by the width of the velocity signal received from the swing motion sensor 180. In another embodiment, the target velocity corresponds to a desired velocity signal width and the swing control circuit 190 is configured to compare the width of the velocity signal to the target velocity width, rather than calculating the actual velocity of the seat 130.

Next, the swing control circuit 190 compares the initial velocity of the seat 130 to the target velocity to determine the width of the first pulse of electric current transmitted to the electromagnetic coil 170 (i.e., the "current pulse width"). If the initial velocity of the seat 130 is less than the target velocity, the swing control circuit 190 sets the current pulse width to a programmed initial pulse width (e.g., 16 milliseconds). If the initial velocity of the seat 130 is greater than the target velocity, the swing control circuit 190 sets the next pulse width to zero, or "no pulse." As mentioned briefly above, in another embodiment, the swing control circuit 190 compares the width of the velocity signal to a target velocity width. Among other advantages, this method allows for the swing control circuit 190 to compensate for a reduction in the magnitude of the voltage provided by the power supply 150 (e.g., as a result of low batteries).

Figure 4A:
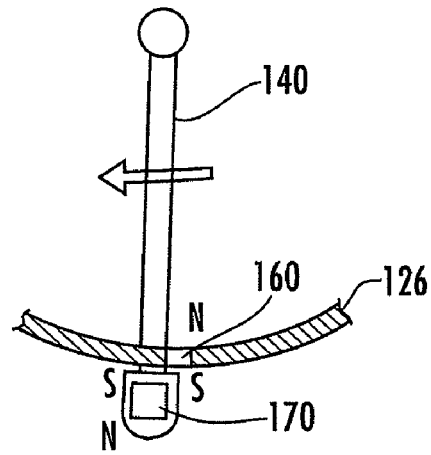
FIG. 4A shows a schematic section view of an electromagnetic drive system according to one embodiment of the present invention.

After passing by the velocity sensing point, the seat 130 swings upwards in the first direction, reaches its peak amplitude, and begins to swing downwards in the second direction toward the permanent magnet 160. The swing control circuit 190 waits to receive the next velocity signal from the swing motion sensor 180. Immediately after the velocity signal is received, the swing control circuit 190 generates a control signal causing a push pulse to be transmitted to the electromagnetic coil 170 having a pulse width equal to the determined current pulse width. FIG. 4A shows the position and polarity of the electromagnetic coil 170 and permanent magnet 160 as the first push pulse is transmitted. In addition, FIGS. 4A-4B indicate the orientation of the poles of the permanent magnet 160 and electromagnetic coil 170 according to one embodiment; "N" being a north pole and "S" being a south pole.

The first push pulse is transmitted at the trailing edge of the velocity signal. In other words, once the infrared sensor 181 has swung past the first reflective surface 182, current is transmitted to the electromagnetic coil 170. At the point when this occurs, the uppermost pole of the electromagnet coil 170 is slightly off-center from the lowermost pole of the permanent magnet 160 in the direction of the seat's 130 motion (as shown in FIG. 4A). As a result, when the electromagnetic coil 170 receives the push pulse, it is repelled away from the permanent magnet 160 in the direction of the seat's 130 motion, thereby driving the seat 130 along its swing path.

According to certain embodiments, the push pulse described above is transmitted following a programmed firing delay after the trailing edge of the velocity signal. Testing of various embodiments of the electromagnetic drive system has shown that such a delay can improve the efficiency of the system, requiring less power to maintain the desired amplitude of the seat 130. In one embodiment, the programmed firing delay is determined by the swing control circuit 190 from a look-up table that correlates firing delays to swing velocity, with lower swing velocities corresponding to longer firing delays. For example, if the swing control circuit 190 determines the appropriate firing delay is 10 milliseconds, the swing control circuit 190 will transmit the push pulse to the electromagnetic coil 170 10 milliseconds after the trailing edge of the velocity signal from the swing motion sensor 180. In addition, the programmed firing delay corresponds to the distance the electromagnetic coil 170 is from the permanent magnet 160. Accordingly, the firing delay may be programmed to ensure push pulses are transmitted when the electromagnetic coil 170 is a certain distance from the permanent magnet 160. In another embodiment, the firing delay may be programmed to occur an amount of time after the leading edge of the velocity signal.

According to another embodiment, the firing delay described above may be implemented by using additional position indicating reflective strips to indicate the position of the electromagnetic coil 170. For example, the swing motion sensor 180 may include one or more additional reflective strips positioned along the support member 126 in order to indicate a target location or locations in which the swing control circuit 190 should trigger the electromagnetic coil 170. In such embodiments, the swing control circuit 190 is configured to distinguish between the additional reflective strips and trigger push or pull pulses to the electromagnetic coil 170 based on the position of the electromagnetic coil 170 as indicated by the additional reflective strips. According to yet another embodiment, the swing motion sensor 180 comprises a sensor capable sensing the absolute position of the electromagnetic coil 170 (e.g., an optical mouse sensor) in relation to the permanent magnet 160, while the swing control circuit 190 is configured to trigger the electromagnetic coil 170 at certain positions as indicated by the swing motion sensor 180.

Just prior to the push pulse being transmitted, the swing control circuit 190 receives the most recent velocity signal and stores the width of the velocity signal. Using the method described above, the swing control circuit 190 determines the current velocity of the seat 130. If the current velocity is lower than the target velocity, the swing control circuit 190 increases the new current pulse width by a defined increment. For example, in one embodiment, the swing control circuit 190 increases the current pulse width by 8 milliseconds when the current velocity is determined to be lower than the target velocity, with a maximum pulse width of 200 milliseconds. Likewise, if the current velocity is greater than the target velocity, the swing control circuit 190 decreases the current pulse width by a defined increment. For example, in one embodiment, the swing control circuit 190 decreases the current pulse width by 8 milliseconds anytime the current velocity is greater than the target velocity, with the pulse width being zero anytime the current pulse width is calculated to be less than 16 milliseconds. According to one embodiment, the swing control circuit 190 is configured to compare the velocity of the seat 130 to the target velocity and adjust the pulse width every half-cycle (i.e., every time the seat 130 passes the velocity sensing point). According to other embodiments, the swing control circuit 190 may be configured to adjust the pulse width less frequently (e.g., every other half-cycle or every third half-cycle).

Figure 4B:
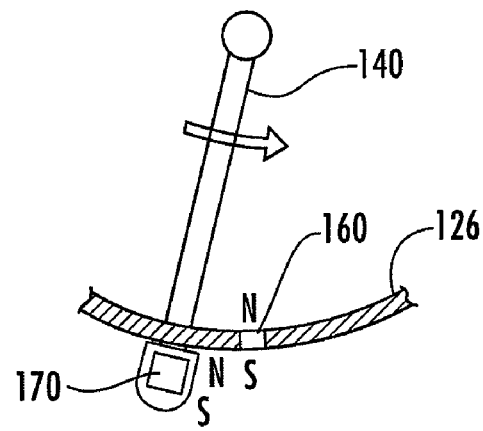
FIG. 4B shows another schematic section view of an electromagnetic drive system according to one embodiment of the present invention.

After being propelled in the second direction by the first push pulse, the seat 130 swings upwards until reaching its peak amplitude. As the seat 130 swings back in the first direction and approaches the permanent magnet 160, the swing control circuit 190 generates a control signal causing a pull pulse to be transmitted to the electromagnetic coil 170 with a pulse width equal to the determined current pulse width. FIG. 4B shows the position and polarity of the electromagnetic coil 170 as the first pull pulse is transmitted.

As illustrated in FIG. 4B, the swing control circuit 190 transmits the pull pulse when the electromagnetic coil 170 is a slight distance away from the permanent magnet 160. The swing control circuit 190 is configured to predict when the electromagnetic coil 170 will be in the desired position by first determining the elapsed time between the previous two velocity signals. The elapsed time between the signals represents the duration of the most recently completed half-period of the seat's 130 motion. The swing control circuit 190 then subtracts a programmed amount of time (corresponding to the distance the electromagnetic coil 170 will be from the permanent magnet 160 when the pull pulse is transmitted) from the half-period duration and determines a trigger time for triggering the pull pulse. In one embodiment, the subtracted time is determined according to a look-up table associating subtraction times with seat velocities or half-period durations. For example, if the determined trigger time is 2.8 seconds, the swing control circuit 190 will trigger the pull pulse to the electromagnetic coil 170 2.8 seconds after the trailing edge of the preceding velocity signal. According to other embodiments in which the swing motion sensor 180 is configured to indicate when the electromagnetic coil 170 is positioned in a target location, the swing control circuit 190 is configured to trigger the pull pulse to the electromagnetic coil 170 when the swing motion sensor indicates the electromagnetic coil 170 is in the target pull-pulse location.

Figure 4C:
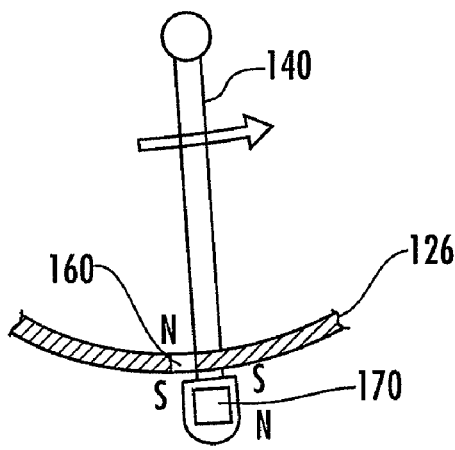
FIG. 4C shows another schematic section view of an electromagnetic drive system according to one embodiment of the present invention.
Figure 4D:
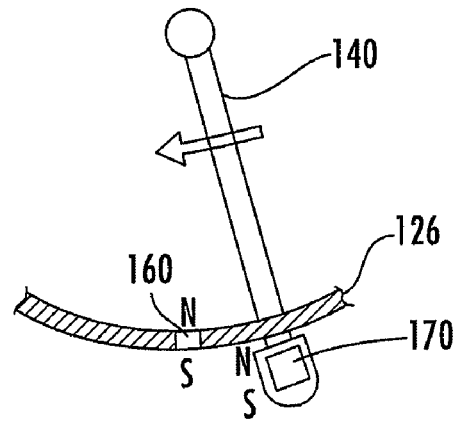
FIG. 4D shows another schematic section view of an electromagnetic drive system according to one embodiment of the present invention.

As shown in FIG. 4B, the pull pulse drives the seat 130 along its swing path in the first direction. After the electromagnetic coil 170 passes by the velocity sensing point, a push pulse having the same pulse width as the pull pulse (i.e., the current pulse width) is transmitted to the electromagnetic coil 170. As shown in FIG. 4C, the position and polarity of the electromagnetic coil 170 relative to the permanent magnet 160 is substantially similar to its position in FIG. 4A. After the push pulse is transmitted, the process described above for determining the current pulse width for the following pair of pull and push pulses is repeated. FIG. 4D shows the position and polarity of the electromagnetic coil 170 as the seat 130 swings back toward the permanent magnet 160 in the second direction and the next pull pulse is triggered.

The swing control circuit 190 is further configured to account for the effects varying support surfaces and changes to the seat's 130 center of gravity may have on the control of the swing 100. For example, in the illustrated embodiment, the swing motion sensor 180 is configured to sense the velocity of the seat 130 at the center of its swing path (i.e., the target sensing point), which occurs at the center of the support member 126 under ideal conditions. In other words, under ideal conditions, the target sensing point and the velocity sensing point are the same. However, if the swing 100 is positioned on a support surface that is not substantially perpendicular to the direction of gravity, the swing path of the seat 130 will shift relative to the velocity sensing point such that the velocity sensing point will be offset from the target sensing point (the center of the swing path). Similarly, as a child shifts its weight within the seat 130, the center of gravity of the seat 130 may affect the position of the swing path relative to the velocity sensing point. In either of these situations, the velocity sensed by the swing motion sensor 180 will be lower than the velocity of the seat 130 at the true center of its swing path. If this error is not accounted for, the swing control circuit 190 will control the seat 130 as if it is swinging slower than it actually is, resulting in an undesirably high amplitude.

After the seat 130 has completed one full period of motion, the swing control circuit 190 begins checking for changes in the position of the velocity sensing point of the swing motion sensor 180 relative to the seat's 130 swing path. When the swing motion sensor 180 is sensing the velocity of the seat 130 at the center of the swing path (the target sensing point), the amount of time the seat 130 is positioned on either side of the first reflective surface 182 is substantially the same. Accordingly, by comparing the amount of time the seat 130 is positioned on either side of the first reflective surface 182, the swing control circuit 190 determines if the swing motion sensor 180 is measuring the velocity of the seat at an offset point. For example, if for one period of motion the swing control circuit 190 determines that the seat 130 is positioned on a first side of the first reflective surface 182 for a greater amount of time than it is on a second side of the first reflective surface 182, the swing control circuit 190 determines that the swing motion sensor 180 is sensing the velocity of the swing at an offset point.

According to another embodiment, the swing control circuit 190 determines whether the swing motion sensor 180 is sensing the velocity of the swing at an offset point by comparing the percentage of time during one sample period of the seat's 130 motion the seat 130 was on either side of the velocity sensing point to a target percentage. This method is useful for embodiments of the swing 100 in which the target sensing point is not the center of the swing path. For example, in such embodiments, the seat 130 will be positioned on either side of the velocity sensing point for different amounts of time depending on the seat's 130 amplitude, even when the velocity sensing point is in the same position as the target sensing point. However, when the velocity sensing point is in the same position as the target sensing point, the percentage of time the seat 130 is on either side of the velocity sensing point (i.e., the target percentage) will remain substantially constant regardless of the swing's amplitude. Accordingly, by comparing timed percentages to the target percentage, the swing control circuit 190 can determine any offset of the velocity sensing point.

To compensate for errors resulting from an offset velocity sensing point, the swing control circuit 190 is configured to adjust the sensed velocity in proportion to the detected offset. For example, in one embodiment, the swing control circuit 190 is configured to calculate the difference between the swing times and determine a corrective factor by which to adjust the sensed velocity based on the calculated time difference (e.g., via an algorithm or look-up table). By estimating the velocity at the center point of the seat's 130 swing path based on the offset-velocity sensed by the swing motion sensor 180, the swing control circuit 190 is able to accurately drive the seat 130 at the target amplitude.

In addition, the swing control circuit 190 is configured to time future pull pulses based on the determined offset. For example, if the swing path of the seat 130 is shifted relative to the first reflective surface 182, it is also true that the electromagnetic coil 170 will not pass by the permanent magnet 160 at the center of its swing path. Accordingly, the swing control circuit 190 is configured to increase or decrease the triggering time for transmitting pull pulses in proportion to the determined offset. This ensures the pull pulses are being transmitted when the electromagnetic coil 170 is in the proper position relative to the permanent magnet 160.

According to various embodiments, the swing control circuit 190 is configured to repeat the processes described above in order to continue driving the seat 130 at the user specified amplitude until the swing time specified by the user has elapsed or the user otherwise stops the swing (e.g., by hand or via the user input controls). In addition, various aspects of the operation of the swing control circuit 190 maybe modified according to various embodiments. For example, in certain embodiments the swing control circuit 190 is configured to control the electromagnetic drive system such that only pull pulses are used to drive the seat 130. In other embodiments, the swing control circuit 190 is configured to control the electromagnetic drive system such that only push pulses are used to drive the seat 130. Moreover, the swing control circuit 190 may be configured to operate based on a variety of different control signals (e.g., the various amplitude-indicative signals described above).

Alternative Embodiments of Swing with Electromagnetic Drive System

According to various other embodiments of the claimed invention, a powered children's swing may include variations of the electromagnetic drive system and other features described above in relation to the embodiments shown in FIGS. 1-4. For example, the electromagnetic drive system according to various embodiments includes at least one magnet or magnetic material and at least one electromagnet capable of selectively attracting or repelling the magnet or magnetic material. In one embodiment, the first magnetic component positioned within the support member 126 is a magnetic material (e.g., Iron). In other embodiments, the first magnetic component is an electromagnetic coil positioned within the support member 126, while the second magnetic component is a permanent magnet or magnetic material positioned within the housing 142. In yet another embodiment, both the first and second magnetic components are electromagnetic coils positioned within the support member 126 and housing 142, respectively.

According to various embodiments, the positioning and orientation of certain swing components may also be modified. For example, in one embodiment the first magnetic component is positioned within the support member 126 at an off-center location (e.g., a position not equidistant from the ends of the support member 126). In addition, the first and second magnetic components may be oriented vertically or horizontally within the support member 126 and housing 142. In certain embodiments, the second magnetic component and its housing may be positioned adjacent a side edge or upper edge of the support member 126 (as opposed to being adjacent the lower edge as shown in FIG. 1). In another embodiment, housing 142, support member 126, and magnetic components may be positioned nearer to the pivot point 141 and concealed within a drive housing.

Figure 5:
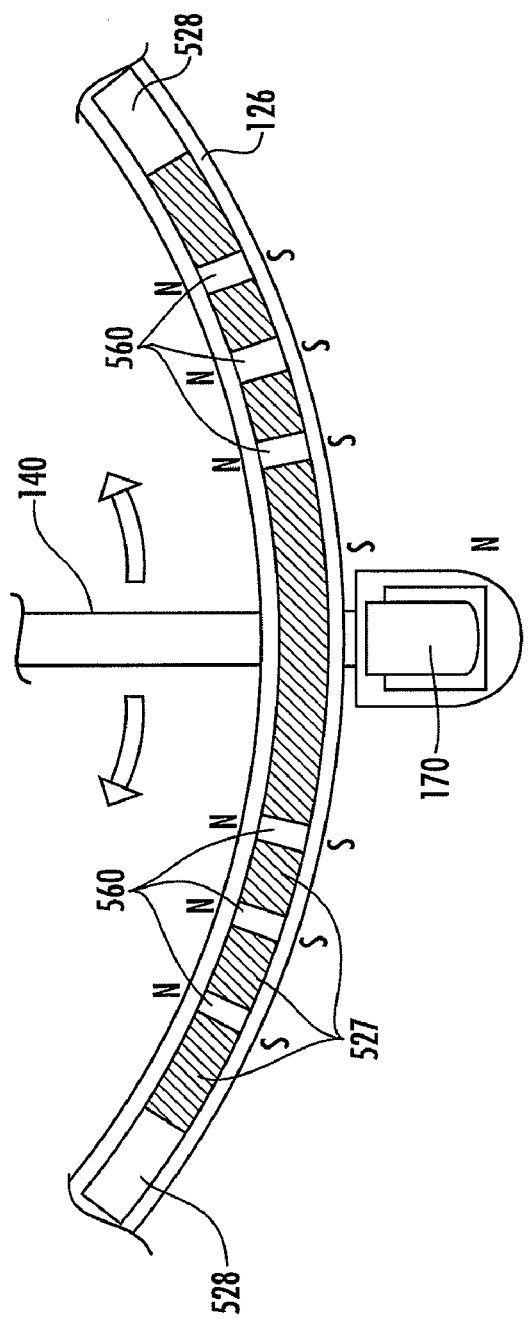
FIG. 5 shows a schematic section view of an electromagnetic drive system according to one embodiment of the present invention.

In other embodiments, the first magnetic component may be comprised of multiple magnets or magnetic material members. For example, in the embodiment shown in FIG. 5, the first magnetic component is comprised of two arrays of permanent magnets 560 spaced apart within the support member 126. As in the embodiment shown in FIGS. 1-3, the electromagnetic coil 170 is operatively connected to the swing arm 140. The permanent magnets 560 are secured within the support member 526 by spacers 527 (positioned between the permanent magnets 560) and compressed springs 528 (positioned on either end of the support member 126). In the illustrated embodiment, the permanent magnets 560 and electromagnetic coil 170 are oriented perpendicular to the support member 126.

The illustrated embodiment includes the swing control circuit 190 (not shown), which is configured to intermittently generate a control signal causing push pulses to be transmitted to the electromagnetic coil 170 as it passes by each of the permanent magnets 560. In one embodiment, the swing control circuit 190 utilizes an optical sensor (e.g., the computer mouse sensor described above) to detect the position of the electromagnetic coil 170 in relation to the permanent magnets 560 and trigger push pulses to the electromagnetic coil 170 at the appropriate points. In another embodiment, separate sensors are positioned along the support member 126 and configured to indicate the position of each of the permanent magnets 560 to the swing control circuit 190, which is configured to trigger push pulses accordingly. In yet another embodiment, the swing control circuit 190 may be configured to transmit push pulses to the electromagnetic coil 170 based on a timing algorithm corresponding to the position of the permanent magnets 560. By causing the electromagnetic coil 170 to be repelled from the permanent magnets 560 over a broader range of the seat's swing path, the driving efficiency and control of the seat's motion may be improved. In various other embodiments utilizing multiple permanent magnets, the swing control circuit 190 may be configured to generate push and/or pull pulses to drive the seat 130.

As will also be appreciated by one of skill in the art, the general principles of the electromagnetic drive system described above may be incorporated into various other swing embodiments. For example, the components of the swing 100 described above may be modified to permit the electromagnetic drive system to drive the seat 130 forward and backward, as opposed to laterally. In addition, it is contemplated that the embodiments of the swing control circuit may be modified to accommodate various embodiments of the electromagnetic drive system such that the amplitude of the swing seat may be controlled as described above.

Swing with Solenoid Drive System

Figure 6:
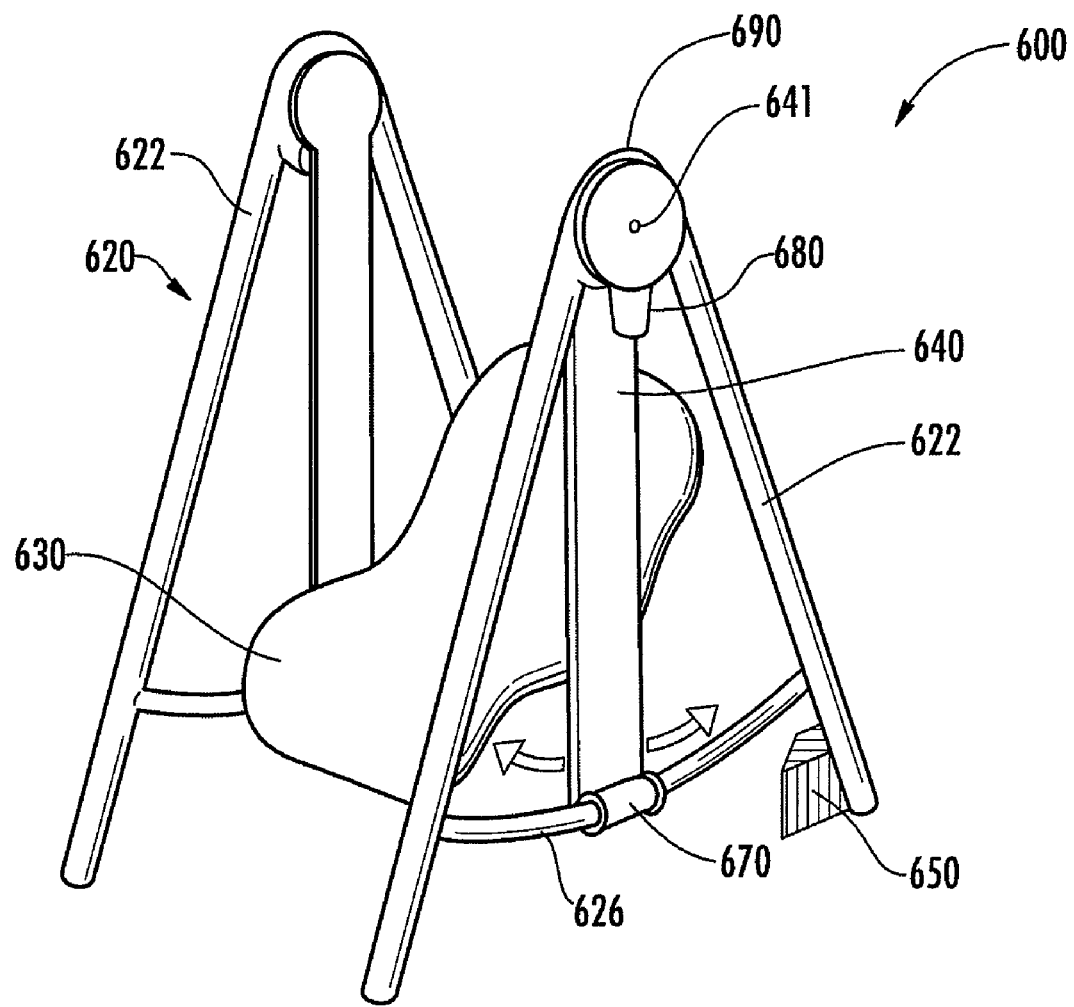
FIG. 6 shows a front perspective view of a powered children's swing according to one embodiment of the present invention.

As shown in FIG. 6, a powered children's swing 600 according to one embodiment includes a swing frame 620, seat 630, swing arms 640, solenoid drive system, swing motion sensor 680, and swing control circuit 690. As used herein, the term "solenoid" refers to a type of electromagnet comprising an electromagnetic coil configured to wrap around a movable core (e.g., a permanent magnet). The swing frame 620 includes two A-frame portions 622 positioned on either side of the seat 630. The A-frame portions 622 are each formed from two legs connected together at their upper ends and configured to rest on a support surface (e.g., a floor) at their lower ends. Each A-frame portion 622 also includes a support member 626 that extends arcuately from a medial portion of one A-frame leg to a medial portion of the adjoining A-frame leg. The arcuate shape of the support member 626 is substantially parallel to the swing path of the seat 630. In addition, the swing frame 620 includes user input controls (not shown), which allow the user to control various aspects of the seat's 630 motion. In one embodiment, the user input controls are substantially similar to those described above in relation to the swing 100 shown in FIG. 1.

The seat 630 is configured to support a child or infant and is pivotally connected to the A-frame portions 622 by the swing arms 640 positioned on either side of the seat 630. The upper end of each swing arm 640 is connected to its respective A-frame portion 622 at a pivot point 641 positioned near the vertex of each pair of A-frame legs. From the pivot points 641, the swing arms 640 extend downwardly toward the support members 626. The swing arms 640 are operatively connected to the seat 630, thereby suspending the seat 630 above the support surface. The pivot points 641 permit the swing arms 640 and the seat 630 to swing forward and backward about the pivot point 641 and along an arcuate swing path (indicated by motion arrows in FIG. 6).

The swing 600 further includes a solenoid drive system comprising a first magnetic component and second magnetic component configured to generate a magnetic force that drives the seat 630 along its swing path. In the illustrated embodiment, the first magnetic component is a permanent magnet 660 (shown in FIGS. 7A-7D) positioned within the support member 626. The second magnetic component comprises an electromagnetic coil 670 operatively connected to a lower end of the swing arm 640. According to various embodiments, the first and second magnetic components of the solenoid drive system may be positioned on both sides of the seat 630 or positioned on only one side of the seat 630. For the purposes of the description of the solenoid drive system herein, the components will be described as being positioned on one side of the seat 630.

As shown in the illustrated embodiment of FIGS. 7A-7D, the permanent magnet 660 is positioned within a medial portion of the support member 626, equidistant from the ends of the support member 626. According to various embodiments, the permanent magnet 660 has a width (measured along the length of the support member 626) equal to or greater than the width of the electromagnetic coil 670. According to one embodiment, the permanent magnet 660 is horizontally oriented within the support member 626 such that one of its poles faces forward toward the front of the swing 600, while the other pole faces rearward toward the rear of the swing 600. The poles of both the permanent magnet 660 and electromagnetic coil 670 according to one embodiment are indicated by "N" (north) and "S" (south) in FIGS. 7A-7D. As described above in relation to the permanent magnet 160 shown in FIG. 2B, the permanent magnet 660 may be comprised of one or more suitable magnets and may be secured within the support member 626 in any suitable fashion. For example, in one embodiment, the permanent magnet 660 is comprised of several smaller, connected permanent magnets arranged in an arcuate shape substantially parallel to the curvature of the support member 626. Moreover, according to various embodiments of the present invention (including but not limited to the swings 100, 600), one or both of the first and second magnetic components may have a substantially arcuate shape.

As shown in FIG. 6 and FIGS. 7A-7D, the electromagnetic coil 670 does not include a metal core and is positioned such that it fits around the support member 626. As a result, a portion of the support member 626 remains positioned within the cavity of the electromagnetic coil 670 and substantially concentric with the electromagnetic coil 670 as the swing arm 640 rotates about the pivot point 641. In addition, as the electromagnetic coil 670 swings past the center of the support member 626, the permanent magnet 660 passes through the cavity of the electromagnetic coil 670.

The electromagnetic coil 670 is configured to generate a magnetic force with the permanent magnet 660 when supplied with electric current from the power supply 650. As described above in relation to the power supply 150, the power supply 650 may comprise any suitable source of electric current (e.g., batteries, plug-in AC/DC power supply). Similar to the electromagnetic drive system described above, pulses of electric current transmitted to the electromagnetic coil 670 by the power supply 650 may be used to drive the seat 630 along its swing path. However, the solenoid drive system allows the seat 630 to be driven by the reaction of the permanent magnet 660 to the concentrated magnetic field present within the cavity of the electromagnetic coil 670. As a result, the magnetic force generated by the pulses is exceptionally strong. In addition, by applying the magnetic force generated by magnetic components to the end of the swing arm 640, the system reduces the force necessary to drive the seat 630. These properties of the solenoid drive system increase the overall efficiency of the system by requiring less power to drive the seat 630 along its swing path.

As will be described in more detail below, the amplitude of the seat's 630 swinging motion can be controlled by the swing control circuit 690, which is configured to control the timing, direction, and width of electric current supplied to the electromagnetic coil 670 based on input from the swing motion sensor 680. In the illustrated embodiment of FIG. 6, the swing motion sensor 680 is an optical sensor (e.g., computer mouse sensor) positioned near the pivot point 641. The swing motion sensor 680 is configured to generate a velocity signal indicative of the velocity of the seat 630 as it passes by the center of the support member 626 (i.e., the velocity sensing point), as well as a direction signal indicating the direction in which the seat 630 is traveling. In another embodiment, the swing motion sensor 680 of FIG. 6 is further configured to generate a signal indicating the absolute position of the electromagnetic coil 670 in relation to the permanent magnet 680.

According to various other embodiments, the swing motion sensor 680 may be a sensor capable of generating a signal indicative of the seat's 630 amplitude and determining the direction in which the seat 630 is traveling (e.g., Hall effect sensor, laser sensor, light interrupter, accelerometer). As described above, a signal corresponding to the velocity of the seat 630 or indicating when the seat 630 changes direction may be indicative of the seat's 630 amplitude. As will be described in more detail below, certain embodiments of the swing 600 include a swing motion sensor capable of determining the position of the seat 630 (e.g., various embodiments of the swing motion sensor 180 described above).

Swing Amplitude Control with Solenoid Drive System

According to various embodiments, the swing control circuit 690 comprises an integrated circuit configured to receive signals from the user input controls and swing motion sensor 680, and generate control signals to control the amplitude of the seat 630. In the illustrated embodiment of FIG. 6, the swing control circuit 690 is positioned within the swing frame 620, near the pivot point 641. Based on input from the swing motion sensor 680 and the user input controls, the swing control circuit 690 is configured to generate control signals causing the seat 630 to swing with an amplitude desired by the user.

In controlling the swing 600, the swing control circuit 690 first receives one or more control signals from one or more of the user input controls. As described above in relation to the swing control circuit 190, the swing control circuit 690 first determines a target amplitude and, if specified, a swing time based on the control signals received from the user input controls. Next, the swing control circuit 690 determines the target velocity corresponding to the target amplitude. In one embodiment, this may also be accomplished using the methodology described above in relation to the swing control circuit 190.

After determining the target velocity, the swing control circuit 690 waits to receive a first velocity signal from the swing motion sensor 680. Similarly to the swing 100, the user first moves the seat 630 away from its resting point and release the seat 630 such that the electromagnetic coil 670 swings past the sensing point of the swing motion sensor 680. As the electromagnetic coil 670 swings past the velocity sensing point in a first direction, the swing control circuit 690 receives an initial velocity signal and an initial direction signal from the swing motion sensor 680.

Based on the initial velocity signal, the swing control circuit 690 next determines the initial velocity of the seat 630. In one embodiment, this may be accomplished using one of the methodologies described above in relation to the swing control circuit 190. Next, the swing control circuit 690 compares the initial velocity of the seat 630 to the target velocity to determine the width of the first pulse of electric current transmitted to the electromagnetic coil 670 (i.e., the "current pulse width"). In one embodiment, the current pulse width is determined based on the same starting pulse (16 milliseconds) and incremental pulse increases and decreases described above in the relation to the swing control circuit 190.

Figure 7A:
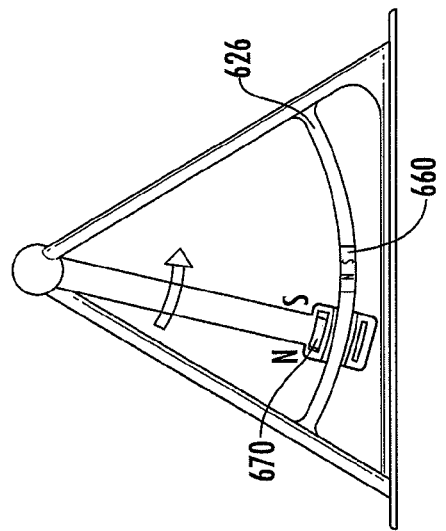
FIG. 7A shows a schematic section view of a solenoid drive system according to one embodiment of the present invention.

After passing by the velocity sensing point, the seat 630 swings upwards in the first direction, reaches its peak amplitude, and begins to swing downwards in the second direction toward the permanent magnet 660. As the electromagnetic coil 670 approaches the permanent magnet 660 in the second direction, the swing control circuit 690 waits to receive the next velocity signal from the swing motion sensor 680. When the swing control circuit 690 detects the trailing edge of the velocity signal, the swing control circuit 690 generates a control signal causing a push pulse having a pulse width equal to the current pulse width to be transmitted to the electromagnetic coil 670. FIG. 7A shows the position and polarity of the electromagnetic coil 670 and permanent magnet 660 as the first push pulse is transmitted. As can be seen from FIG. 7A, the push pulse occurs just as the leading pole of the electromagnetic coil 670 moves past the end of the permanent magnet 660. According to various other embodiments, the push pulses generated by the solenoid drive system may also incorporate the firing delay described above in relation to the swing control circuit 190. In addition, according to various embodiments, the swing control circuit 690 may be configured to trigger the push pulse using a number of different methods, such as those described herein in relation to the swing control circuit 190.

After receiving the velocity signal and triggering the push pulse, the swing control circuit 690 determines the new current pulse width by comparing the current velocity of the seat 630 with the target velocity. The swing control circuit 690 also prepares to trigger a pull pulse by determining the appropriate trigger time. In one embodiment, both of these functions are accomplished in accordance with the methodologies described above in relation to the swing control circuit 190.

Figure 7B:
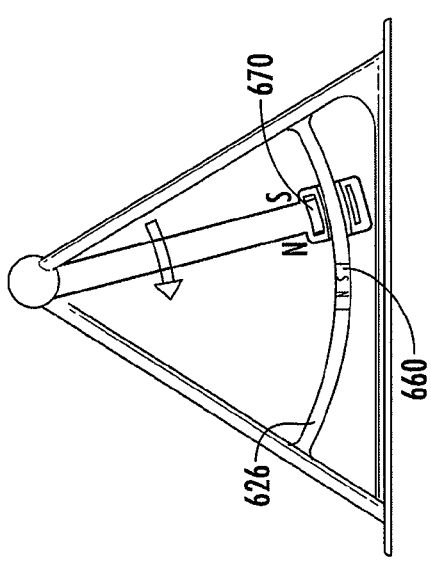
FIG. 7B shows another schematic section view of a solenoid drive system according to one embodiment of the present invention.

After being propelled in the second direction by the first push pulse, the seat 630 swings upwards, reaches its peak amplitude, and swings back in the first direction toward the permanent magnet 660. When the trigger time determined above elapses, the swing control circuit 690 generates a control signal causing a pull pulse having a pulse width equal to the determined next pulse width to be transmitted to the electromagnetic coil 670. FIG. 7B shows the position and polarity of the electromagnetic coil 670 as the first pull pulse is transmitted. As illustrated in FIG. 7B, the trigger time results in the swing control circuit 690 triggering the pull pulse when the electromagnetic coil 670 is a slight distance away from the permanent magnet 660. In addition, the polarity of the electromagnetic coil 670 is reversed in order to attract the electromagnetic coil 170 to the permanent magnet 660. However, as described above in relation to the swing control circuit 190, a maximum pulse width defined by the swing control circuit 690 limits the width of the pull pulse and ensures that the pull pulse ends before the electromagnetic coil 670 becomes aligned with the permanent magnet 660. In addition, according to various embodiments, the swing control circuit 690 may be configured to trigger the pull pulse using a number of different methods, such as those described herein in relation to the swing control circuit 190.

Figure 7C:
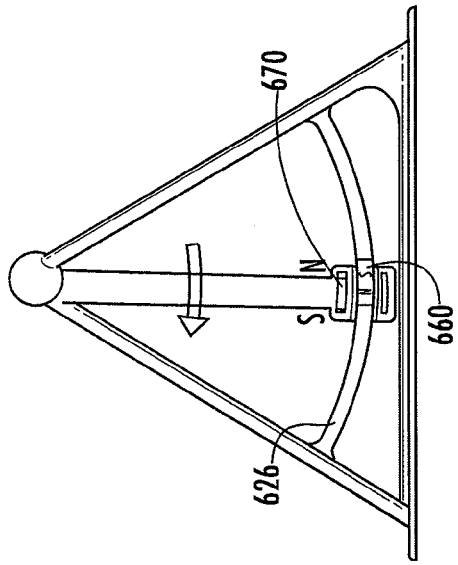
FIG. 7C shows another schematic section view of a solenoid drive system according to one embodiment of the present invention.

As shown in FIG. 7B, the pull pulse drives the seat 630 along its swing path in the first direction. After the electromagnetic coil 670 passes by the velocity sensing point, the swing control circuit 690 generates a control signal causing a push pulse having a pulse width equal to the width of the pull pulse (i.e., the current pulse width) to be transmitted to the electromagnetic coil 670. As shown in FIG. 7C, the position and polarity of the electromagnetic coil 670 relative to the permanent magnet 660 is substantially similar to its position and polarity in FIG. 7A.

Figure 7D:
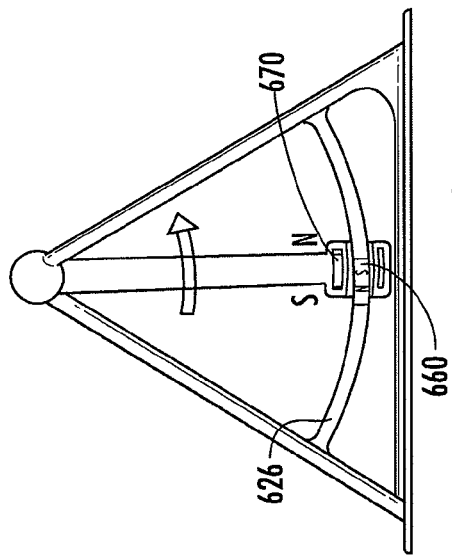
FIG. 7D shows another schematic section view of a solenoid drive system according to one embodiment of the present invention.

After the push pulse of FIG. 7C is transmitted, the process described above for determining the new current pulse width for the next pair of pull and push pulses is repeated. For example, FIG. 7D shows the position and polarity of the electromagnetic coil 670 as the seat 630 swings back toward the permanent magnet 660 in the second direction. In addition, using the methodology described above in relation to the swing control circuit 190, the swing control circuit 690 is also configured to adjust the velocity indicated by the swing motion sensor 680 to compensate for any detected offset velocity sensing point (e.g., as a result of an uneven support surface, or changes in the seat's 630 center of gravity). The swing control circuit 690 is also configured to adjust the trigger time for pull pulses in order to compensate for an offset velocity sensing point.

According to various embodiments, the swing control circuit 690 is configured to repeat the processes described above in order to continue driving the seat 630 at the user specified amplitude until the swing time specified by the user has elapsed or the user otherwise stops the swing (e.g., by hand or via the user input controls). In addition, various aspects of the operation of the swing control circuit 690 may be modified according to various embodiments. For example, in certain embodiments the swing control circuit 690 is configured control the solenoid drive system such that only push pulses are used to drive the seat 130. Moreover, the swing control circuit 690 may be configured to operate based on a variety of different control signals (e.g., the various amplitude-indicative signals described above).

Alternative Embodiments of Swing with Solenoid Drive System

According to various other embodiments of the claimed invention, a powered children's swing may include variations of the solenoid drive system and other features described above in relation to the embodiments shown in FIGS. 6-7D. For example, according to certain embodiments, the configuration of the swing frame 620 may be altered. In one embodiment, the support member 626 and magnetic components may be positioned nearer to the pivot point 641 and concealed within a drive housing.

Figure 8A:
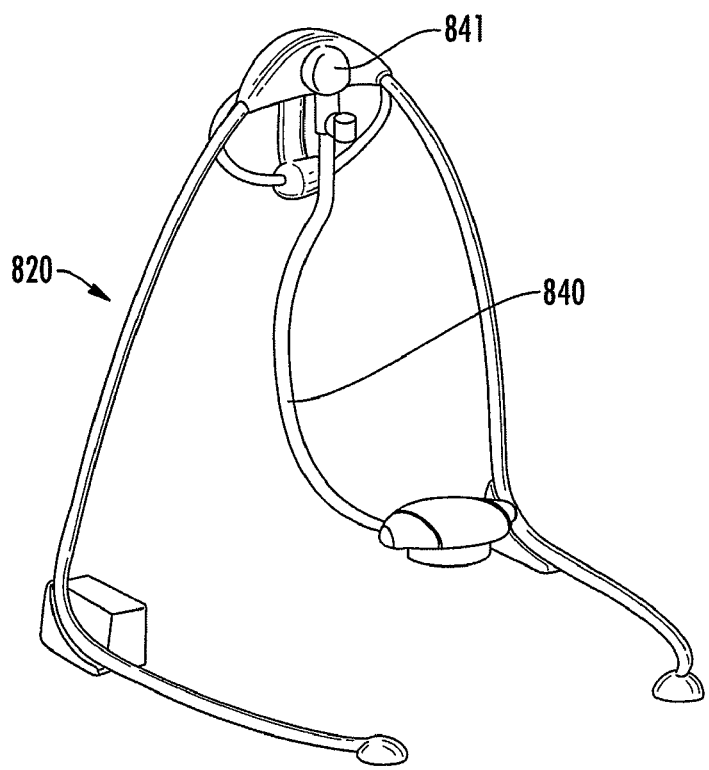
FIG. 8A shows a front perspective view of components of a powered children's swing according to one embodiment of the present invention.
Figure 8B:
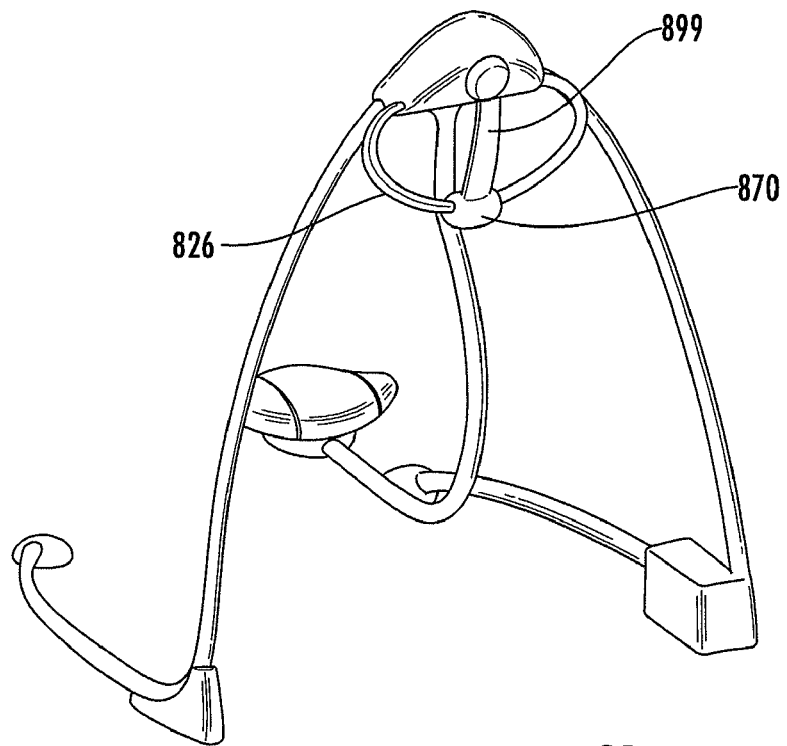
FIG. 8B shows a rear perspective view of components of a powered children's swing according to one embodiment of the present invention.

In another embodiment, shown in FIGS. 8A and 8B, the solenoid drive system is incorporated on a swing frame 820 resembling the swing frame 120 described above. Similarly to the swing frame 120, the swing frame 820 is configured to permit a swing arm 840 to swing laterally about a pivot point 841. In the illustrated embodiment, the solenoid drive system comprising an electromagnetic coil 870 and a permanent magnet (not shown) is configured to drive the seat (not shown) laterally along a swing path. Similarly to the solenoid drive system described above, the electromagnetic coil 870 is positioned around a support member 826 and configured to drive the seat via a drive arm 899 operatively connected to the swing arm 840.

Figure 9:
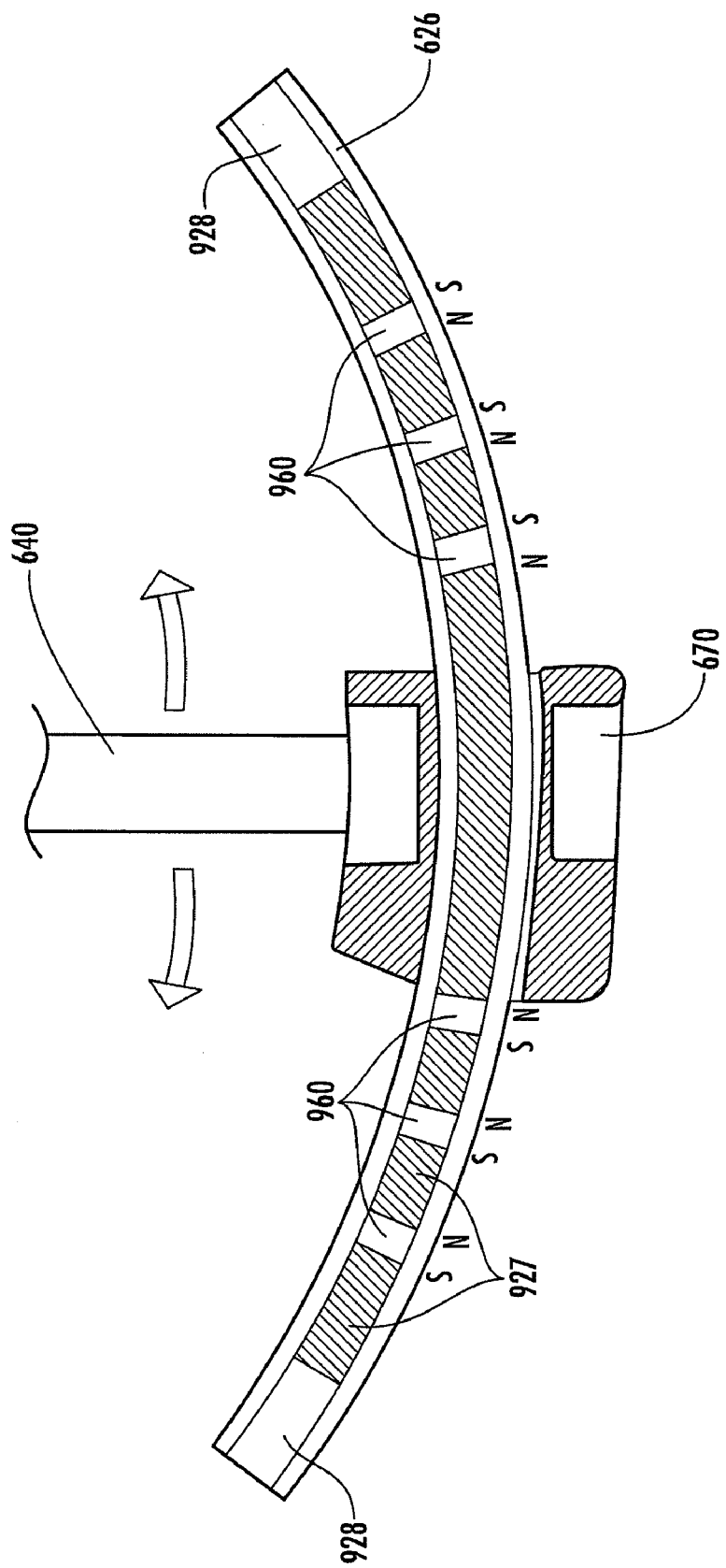
FIG. 9 shows a schematic section view of a solenoid drive system according to one embodiment of the present invention.

According to various other embodiments, the first magnetic component of the swing 600 may comprise multiple permanent magnets. For example, in the embodiment shown in FIG. 9, the first magnetic component is comprised of two arrays of permanent magnets 960 spaced apart within the support member 626. The permanent magnets 960 are secured within the support member 626 by spacers 927 positioned between the permanent magnets 960 and compressed springs 928 positioned on either end of the support member 926. According to one embodiment, the polarity of the permanent magnets 960, indicated by "N" (north) and "S" (south) markings, are mirrored such that the magnet arrays repel each other.

In the illustrated embodiment, the swing control circuit 690 (not shown) is configured to drive the seat 630 (not shown) by pulsing the electromagnetic coil 670 as it moves along the support member 626 between the permanent magnets 960 arrays. Based on signals received from the swing motion sensor 680 (not shown), the swing control circuit 690 determines the direction of the electromagnetic coil 670 and reverses its polarity as its amplitude peaks and swing direction changes. In the embodiment shown in FIGS. 7A-7D and described above, the electromagnetic coil 670 is pulsed at a particular time coinciding with its position relative to the permanent magnet 660. However, in the illustrated embodiment of FIG. 9, the electromagnetic coil 670 may be pulsed and driven by the magnetic forces generated between it and the permanent magnets 960 across the full range of the electromagnetic coil's 670 motion. For example, in one embodiment, the swing motion sensor 680 is a sensor configured to sense the absolute position of the electromagnetic coil 170 (e.g., an optical mouse sensor) and map the motion of the electromagnetic coil 170, as well as the seat 630, to a processor of the swing control circuit 190. The swing control circuit 690 is then configured to pulse the electromagnetic coil 670 at appropriate points over the range of the electromagnetic coil's 670 motion based on the position of the electromagnetic coil 670 as indicated by the swing motion sensor 680.

By keeping the polarity of the electromagnetic coil 670 configured to drive the electromagnetic coil 670 in the direction of the seat's 630 motion, the swing control circuit 690 can pulse the electromagnetic coil 670 as needed to maintain the amplitude of the seat's 630 motion. Accordingly, the swing control circuit 690 is configured to monitor the amplitude of the seat 630 as described above in relation to the swing 600 (e.g., by comparing the velocity of the seat 630 to a target velocity or sensing the absolute position of the seat 630) and generate control signals triggering pulses to the electromagnetic coil 670 as necessary to maintain the target amplitude. In certain embodiments, the swing control circuit 690 is configured to self-start, or begin swinging the seat 630 without a motive force provided by the user. This is accomplished by transmitting pulses of electric current in alternating directions to the electromagnetic coil 670, thereby causing the electromagnetic coil 670 (and thereby the seat 630) to be pulled back and forth between the permanent magnet 960 arrays.

As will be appreciated by one of skill in the art, various other embodiments of a power children's swing incorporating the solenoid drive system described herein may be used to drive a swing seat at a user-defined, substantially constant amplitude.

CONCLUSION

Many modifications and other embodiments of the present invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A powered children's swing for swinging a child, the children's swing comprising:
   a seat;
   a swing frame configured to support the seat;
   one or more swing arms rotatably supported on the swing frame, wherein at least one of the swing arms supports the seat thereby suspending the seat and permitting the seat to swing along a path;
   a first magnetic component operatively connected to the swing frame;
   a second magnetic component operatively connected to the seat, wherein at least one of the magnetic components comprises an electromagnet;
   a swing motion sensor configured to generate a signal indicative of an amplitude of the seat's swing motion; and
   a swing control circuit configured to:
   receive the signal from the swing motion sensor;
   compare the signal from the swing motion sensor with a value indicative of a goal amplitude for the swing;
   generate a first electrical signal based on the comparison that causes electric current to be supplied to the electromagnet thereby generating an attractive magnetic force between the first magnetic component and second magnetic component that causes the seat to swing with an amplitude nearer to the goal amplitude; and
   generate a second electrical signal based on the comparison that causes electric current to be supplied to the electromagnet thereby generating a repulsive magnetic force between the first magnetic component and second magnetic component that causes the seat to swing with an amplitude nearer to the goal amplitude.

2. The powered children's swing of claim 1, wherein:
   the swing control circuit is further configured to:
   determine when the second magnetic component is a certain distance from the first magnetic component;
   determine when the second magnetic component is moving toward the first magnetic component; and
   generate the first electrical signal when the second magnetic component is the certain distance from the first magnetic component and the second magnetic component is moving toward the first magnetic component.

3. The powered children's swing of claim 2, wherein:
   the swing control circuit is further configured to:

determine the position of the first magnetic component in relation to a center point of the seat's swing path; and time the generation of the first electrical signal based, at least in part, on the position of the first magnetic component in relation to the center point.

4. The powered children's swing of claim 1, wherein:
the swing control circuit is further configured to:
determine when the second magnetic component is a certain distance from the first magnetic component;
determine when the second magnetic component is moving away from the first magnetic component; and
generate the second electrical signal when the second magnetic component is the certain distance from the first magnetic component and the second magnetic component is moving away from the first magnetic component.

5. The powered children's swing of claim 1, wherein:
the first electrical signal and second electrical signal correspond to a duration of electric current transmitted to the electromagnet.

6. The powered children's swing of claim 1, wherein the second magnetic component comprises an electromagnet.

7. The powered children's swing of claim 6, wherein the first magnetic component comprises one or more permanent magnets.

8. The powered children's swing of claim 6, wherein the first magnetic component comprises a magnetic material.

9. The powered children's swing of claim 1, wherein the first magnetic component comprises an electromagnet.

10. The powered children's swing of claim 9, wherein the second magnetic component comprises one or more permanent magnets.

11. The powered children's swing of claim 9, wherein the second magnetic component comprises a magnetic material.

12. A method for controlling a swing comprising a seat configured to swing along a swing path, the method comprising the steps of:
sensing the velocity of the seat at a first point along the swing path of the seat;
detecting when the first point is spaced from a target sensing point along the swing path of the seat;
in response to detecting the first point is not proximate to the target sensing point, estimating the velocity of the seat at the target sensing point based, at least in part, on the sensed velocity of seat at the first point.

13. The method of claim 12, further comprising the steps of:
comparing the estimated velocity of the seat at the target sensing point with a value indicative of a goal velocity corresponding to a goal amplitude for the seat; and
adjusting a force driving the seat along the swing path based on the comparison thereby causing the seat to swing with an amplitude nearer to the goal amplitude.

14. The method of claim 12, wherein:
the step of adjusting a force driving the seat is accomplished by generating an electrical signal based on the comparison that causes electric current to be supplied to an electromagnet thereby generating a magnetic force that causes the seat to swing with an amplitude nearer to the goal amplitude.

15. The method of claim 14, wherein the electrical signal corresponds to a duration of an electric current transmitted to the electromagnet.

16. The method of claim 12, wherein:
the step of detecting when the first point is not proximate to the target sensing is accomplished by:
determining for a sample period of the seat's swing motion the amount of time the seat was positioned on a first side of the first point along the swing path, the amount of time the seat was positioned on a second side of the first point along the swing path, and the percentage of the total duration of the sample period the seat was positioned on the first side of the first point; and
comparing the percentage of the total duration of the sample period the seat was positioned on the first side of the first point to a target percentage corresponding to the target sensing point.

17. A powered children's swing for swinging a child, the children's swing comprising:
a seat;
a swing frame configured to support the seat;
one or more swing arms rotatably supported on the swing frame, wherein at least one of the swing arms supports the seat thereby suspending the seat and permitting the seat to swing along a path;
a first magnetic component operatively connected to the swing frame;
a second magnetic component operatively connected to the seat, wherein:
at least one of the first and second magnetic components defines an arcuate shape;
at least one of the first and second magnetic components defines an arcuate path generally parallel to the swing path of the seat and adjacent to the other of the first and second magnetic components; and
at least one of the magnetic components comprises an electromagnet configured to selectively generate a magnetic force with the other magnetic component so as to cause the seat to swing along its swing path.

18. The powered children's swing of claim 17, wherein the at least one magnetic component defining an arcuate shape is comprised of two or more permanent magnets positioned to define an arcuate shape.

19. The powered children's swing of claim 17, wherein the at least one magnetic component defining an arcuate shape is comprised of two or more permanent magnets spaced apart along an arcuate path.

20. The powered children's swing of claim 19, further comprising:
a swing motion sensor configured to generate a signal indicative of an amplitude of the seat's swing motion; and
a swing control circuit configured to:
receive the signal from the swing motion sensor;
compare the signal from the swing motion sensor with a value indicative a goal amplitude for the swing; and
generate electrical signals based on the comparison that cause electric current to be supplied to the electromagnet thereby generating magnetic forces between the two or more permanent magnets and the electromagnet and thereby causing the seat to swing with an amplitude nearer to the goal amplitude.

21. A powered children's swing for swinging a child, the children's swing comprising:
a seat;
a swing frame configured to support the seat and defining at least one arcuate support member;
one or more swing arms rotatably supported on the swing frame, wherein at least one of the swing arms supports the seat thereby suspending the seat and permitting the seat to swing along a path, wherein the arcuate support member is positioned adjacent the swing path of the seat and is curved generally parallel to the swing path of the seat;

a first magnetic component supported by the arcuate support member; and
a second magnetic component operatively connected to the seat, wherein:
the second magnetic component is configured to move along a path generally parallel to and adjacent to the arcuate support member as the seat swings along its swing path; and
at least one of the magnetic components comprises an electromagnet configured to selectively generate a magnetic force with the other magnetic component so as to cause the seat to swing along its swing path.

22. The powered children's swing of claim 21, wherein:
the second magnetic component is an electromagnetic coil defining a central cavity;
at least a portion of the arcuate support member is positioned within the central cavity along the path of the second magnetic component; and
the first magnetic component is positioned within the arcuate support member.

23. The powered children's swing of claim 22, wherein:
the central cavity of the second magnetic component has a circular cross section; and
the arcuate support member has a circular cross section and is positioned substantially concentric to the central cavity along the path of the second magnetic component.

24. The powered children's swing of claim 23, wherein:
the seat is configured to swing forward and backward; and
the arcuate support member is positioned to the side of the seat.

25. The powered children's swing of claim 21, wherein:
the seat is configured to swing laterally;
the second magnetic component is an electromagnet; and
the arcuate support member is positioned substantially behind the seat and adjacent the second magnetic component along the path of the second magnetic component.

26. The powered children's swing of claim 25, wherein the at least one swing arm supporting the seat is configured to flex in response to a load positioned in the seat having a particular weight, thereby aligning the poles of the first magnetic component and second magnetic component.

27. A powered children's swing for swinging a child, the children's swing comprising:
a seat;
a swing frame configured to support the seat and defining at least one support member;
one or more swing arms rotatably supported on the swing frame, wherein at least one of the swing arms supports the seat thereby suspending the seat and permitting the seat to swing along a path;
a first magnetic component supported by the support member; and
a second magnetic component operatively connected to the seat, wherein:
the second magnetic component comprises an electromagnetic coil having a central cavity, the first magnetic component being positioned within the central cavity as the second magnetic component passes by the first magnetic component; and
the second magnetic component is configured to selectively generate a magnetic force with the first magnetic component so as to cause the seat to swing along its swing path.

28. A powered children's swing for swinging a child, the children's swing comprising:
a seat;
a swing frame configured to support the seat;
one or more swing arms rotatably supported on the swing frame, wherein at least one of the swing arms supports the seat thereby suspending the seat and permitting the seat to swing along a path;
a first magnetic component operatively connected to the swing frame;
a second magnetic component operatively connected to the seat, wherein at least one of the magnetic components comprises an electromagnet;
a swing motion sensor configured to generate a signal indicative of an amplitude of the seat's swing motion; and
a swing control circuit configured to:
receive the signal from the swing motion sensor;
compare the signal from the swing motion sensor with a value indicative of a goal amplitude for the swing;
determine when the second magnetic component is a certain distance from the first magnetic component;
determine when the second magnetic component is moving away from the first magnetic component; and
generate an electrical signal based on the comparison that causes electric current to be supplied to the electromagnet thereby generating a magnetic force between the first magnetic component and second magnetic component that causes the seat to swing with an amplitude nearer to the goal amplitude, wherein the electrical signal is generated when the second magnetic component is the certain distance from the first magnetic component and the second magnetic component is moving away from the first magnetic component.

29. The powered children's swing of claim 28, wherein the swing control circuit is configured to determine when the second magnetic component is the certain distance from the first magnetic component by determining when a predefined period of time has elapsed after receiving the signal from the swing motion sensor.

30. The powered children's swing of claim 28, wherein the swing motion sensor is further configured to generate a position signal indicating when the second magnetic component is positioned proximate a location on the swing frame spaced from the first magnetic component; and
wherein the swing control circuit is configured to receive the position signal from the swing motion sensor and determine when the second magnetic component is the certain distance from the first magnetic component based on the position signal.

31. A powered children's swing for swinging a child, the children's swing comprising:
a seat;
a swing frame configured to support the seat and permit the seat to swing along a path;
a drive system configured to drive the seat along the path;
a swing motion sensor configured to:
generate a first signal indicative of a first amplitude of the seat's swing motion, the first amplitude of the seat's swing motion occurring at a first point in time and resulting from a displacement of the seat by a user; and
generate a second signal indicative of a second amplitude of the seat's swing motion, the second amplitude of the seat's swing motion occurring at a second point in time, wherein the second point in time occurs after the first point in time;

a swing control circuit configured to:
    receive the first signal from the swing motion sensor;
    receive the second signal from the swing motion sensor;
    compare the first signal from the swing motion sensor with the second signal from the swing motion sensor; and
    generate an electrical signal based on the comparison that causes the drive system to drive the seat to swing with an amplitude nearer to the first amplitude.

* * * * *